United States Patent
Kobayashi

[11] Patent Number: 6,023,297
[45] Date of Patent: Feb. 8, 2000

[54] ENCODING METHOD AND ENCODER USING IT

[75] Inventor: Mitsugu Kobayashi, Kanagawa, Japan

[73] Assignee: Sony Corporation, Tokyo, Japan

[21] Appl. No.: 09/237,697

[22] Filed: Jan. 26, 1999

Related U.S. Application Data

[63] Continuation of application No. PCT/JP98/02245, May 22, 1998.

[30] Foreign Application Priority Data

May 28, 1997 [JP] Japan .................................. 9-138906

[51] Int. Cl.[7] ...................................................... H04N 7/36
[52] U.S. Cl. ............................................ 348/405; 348/412
[58] Field of Search .................................... 348/405, 412, 348/413, 415, 416; H04N 7/36

[56] References Cited

U.S. PATENT DOCUMENTS

| | | | |
|---|---|---|---|
| 5,291,282 | 3/1994 | Nakagawa | 348/415 |
| 5,317,396 | 5/1994 | Fujinami | 348/415 |
| 5,748,249 | 5/1998 | Fujiwara | 348/405 |
| 5,822,006 | 10/1998 | Tahara | 348/412 |
| 5,880,785 | 3/1999 | Fujiwara | 348/405 |
| 5,926,222 | 7/1999 | Nickerson | 348/405 |

FOREIGN PATENT DOCUMENTS

| | | |
|---|---|---|
| 4-2291 | 1/1992 | Japan . |
| 4-257185 | 9/1992 | Japan . |
| 4-317264 | 11/1992 | Japan . |
| 6-121171 | 4/1994 | Japan . |
| 6-350985 | 12/1994 | Japan . |
| 7-203430 | 8/1995 | Japan . |
| 7-312754 | 11/1995 | Japan . |
| 8-280015 | 10/1996 | Japan . |
| 9-65332 | 3/1997 | Japan . |
| 9-107293 | 4/1997 | Japan . |
| 9-120802 | 5/1997 | Japan . |

*Primary Examiner*—Howard Britton
*Attorney, Agent, or Firm*—Frommer Lawrence & Haug, LLP.; William S. Frommer

[57] ABSTRACT

The deterioration of the quality of a picture due to encoding/decoding is improved by setting the quantity of feedback on which the contents of input data reflect.

Judging means 50 for judging whether input data are encoded/decoded or not based upon each quantity of generated codes in units of GOP from N pieces of fixed quantizers and control means for estimating the character of input data using the above each quantity of generated codes and the result of the judgment and calculating a feedback threshold FBT to be added to the target quantity of codes based upon the result of the estimate are provided. When the judging means judges that encoding/decoding is executed, the means controls a feedback threshold FBT using each quantity of generated codes in units of GOP from N pieces of fixed quantizers so that the variation of quantized values between macro blocks is reduced and in the result of the other judgment, the means controls a feedback threshold FBT so that repeatability is regarded as important. Hereby, the quality of a picture is prevented from being deteriorated due to encoding/decoding.

6 Claims, 16 Drawing Sheets

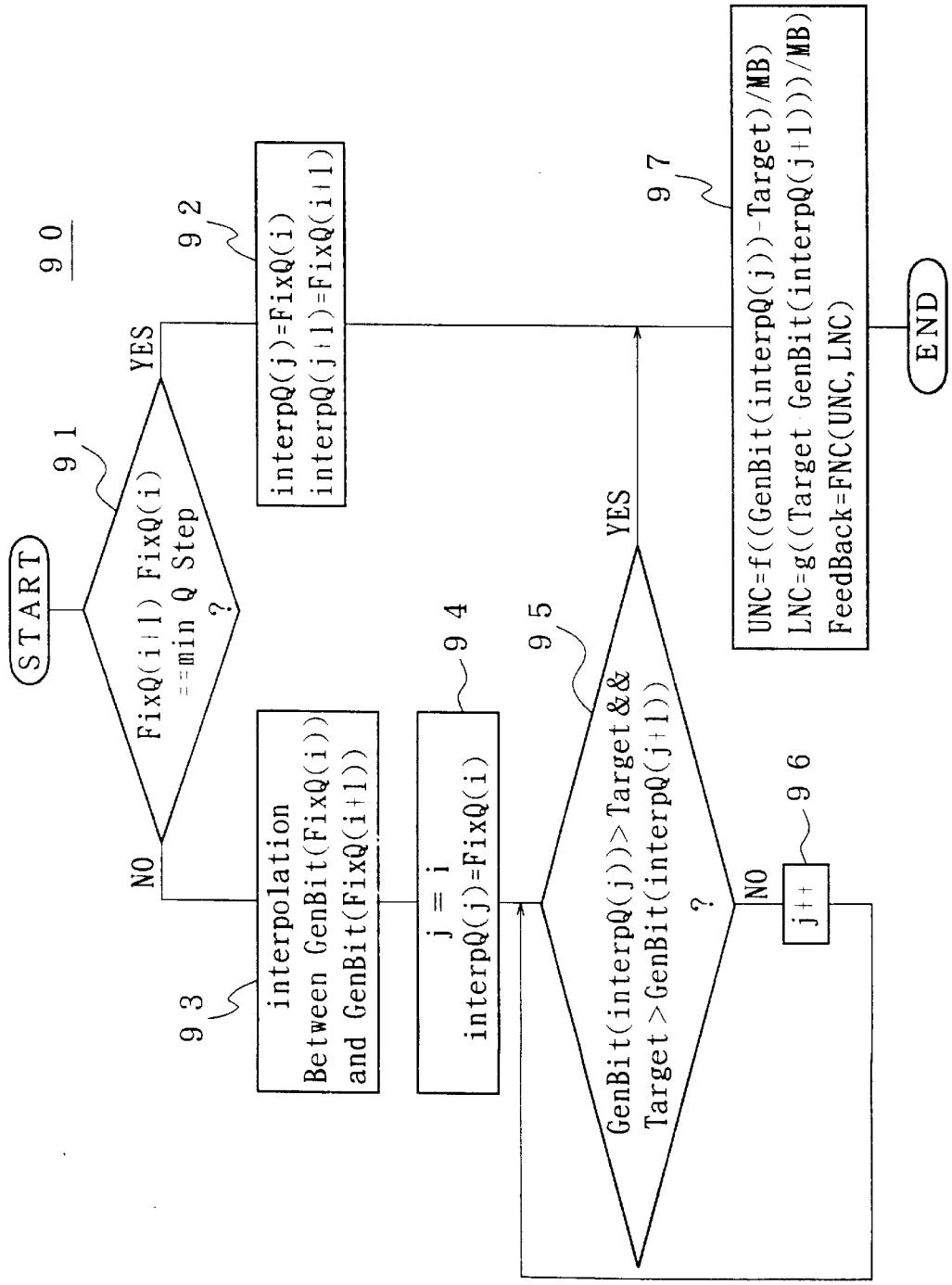

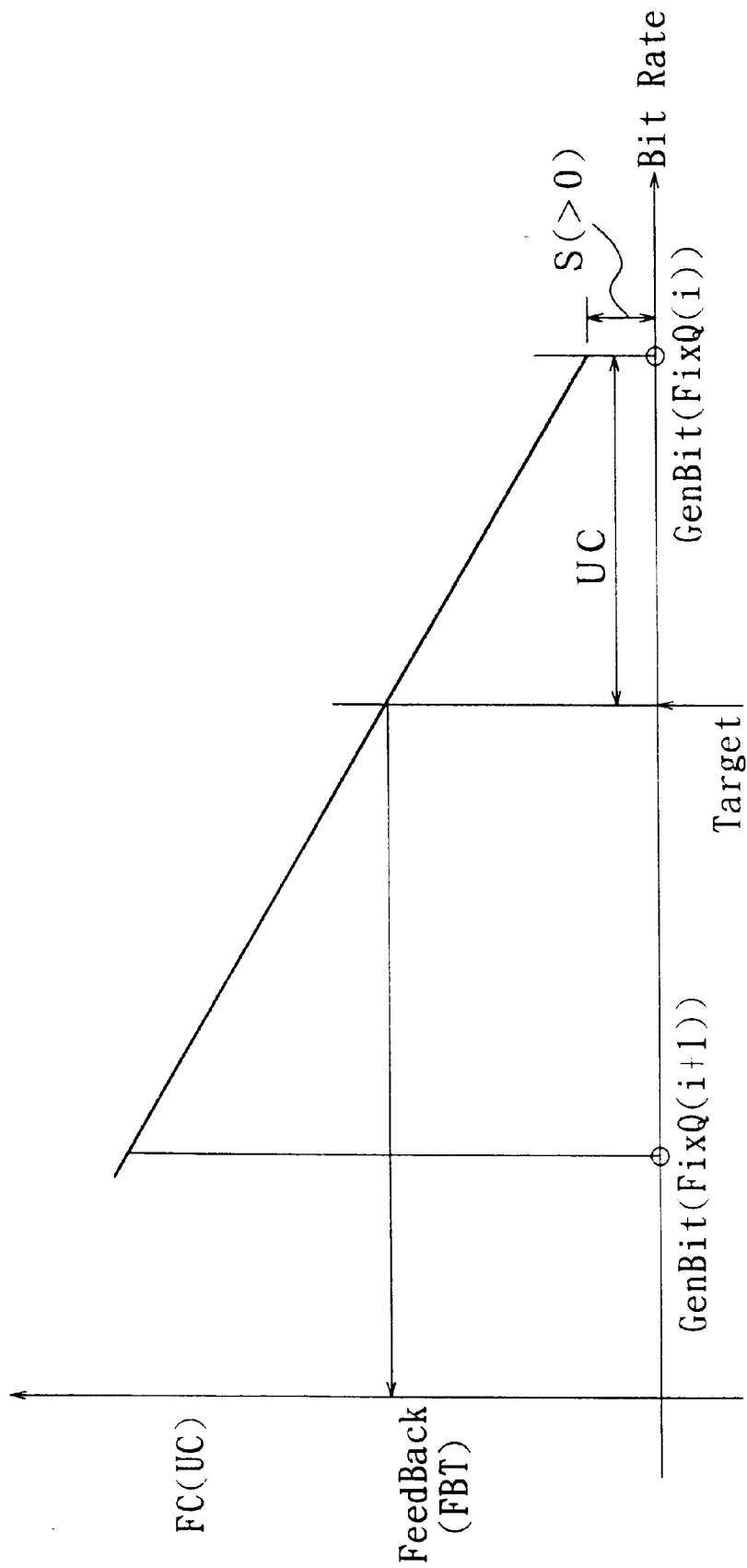

FIG. 10

MACRO BLOCK DATA OF Y

| 164 | 149 | 154 | 92  | 100 | 197 | 192 | 187 | 208 | 140 | 89  | 182 | 211 | 163 | 143 | 166 |
| 146 | 147 | 133 | 102 | 180 | 235 | 221 | 181 | 59  | 46  | 189 | 221 | 149 | 154 | 177 | 162 |
| 146 | 147 | 147 | 146 | 126 | 158 | 205 | 196 | 147 | 44  | 31  | 107 | 125 | 80  | 85  | 114 |
| 134 | 127 | 113 | 128 | 108 | 113 | 149 | 139 | 99  | 58  | 107 | 109 | 71  | 117 | 138 | 147 |
| 164 | 149 | 154 | 92  | 100 | 197 | 192 | 187 | 208 | 140 | 89  | 182 | 211 | 163 | 143 | 166 |
| 146 | 147 | 133 | 102 | 180 | 235 | 221 | 181 | 59  | 46  | 189 | 221 | 149 | 154 | 177 | 162 |
| 146 | 147 | 147 | 146 | 126 | 158 | 205 | 196 | 147 | 44  | 31  | 107 | 125 | 80  | 85  | 114 |
| 134 | 127 | 113 | 128 | 108 | 113 | 149 | 139 | 99  | 58  | 107 | 109 | 71  | 117 | 138 | 147 |
| 164 | 149 | 154 | 92  | 100 | 197 | 192 | 187 | 208 | 140 | 89  | 182 | 211 | 163 | 143 | 166 |
| 146 | 147 | 133 | 102 | 180 | 235 | 221 | 181 | 59  | 46  | 189 | 221 | 149 | 154 | 177 | 162 |
| 146 | 147 | 147 | 146 | 126 | 158 | 205 | 196 | 147 | 44  | 31  | 107 | 125 | 80  | 85  | 114 |
| 134 | 127 | 113 | 128 | 108 | 113 | 149 | 139 | 99  | 58  | 107 | 109 | 71  | 117 | 138 | 147 |
| 164 | 149 | 154 | 92  | 100 | 197 | 192 | 187 | 208 | 140 | 89  | 182 | 211 | 163 | 143 | 166 |
| 146 | 147 | 133 | 102 | 180 | 235 | 221 | 181 | 59  | 46  | 189 | 221 | 149 | 154 | 177 | 162 |
| 146 | 147 | 147 | 146 | 126 | 158 | 205 | 196 | 147 | 44  | 31  | 107 | 125 | 80  | 85  | 114 |
| 134 | 127 | 113 | 128 | 108 | 113 | 149 | 139 | 99  | 58  | 107 | 109 | 71  | 117 | 138 | 147 |

FIG. 11

MACRO BLOCK DATA OF Cr

| 110 | 98  | 110 | 110 | 106 | 133 | 137 | 136 |
|-----|-----|-----|-----|-----|-----|-----|-----|
| 115 | 115 | 120 | 105 | 115 | 126 | 119 | 125 |
| 125 | 119 | 120 | 111 | 110 | 123 | 108 | 108 |
| 117 | 119 | 118 | 117 | 121 | 126 | 124 | 126 |
| 110 | 98  | 110 | 110 | 106 | 133 | 137 | 136 |
| 115 | 115 | 120 | 105 | 115 | 126 | 119 | 125 |
| 125 | 119 | 120 | 111 | 110 | 123 | 108 | 108 |
| 117 | 119 | 118 | 117 | 121 | 126 | 124 | 126 |
| 110 | 98  | 110 | 110 | 106 | 133 | 137 | 136 |
| 115 | 115 | 120 | 105 | 115 | 126 | 119 | 125 |
| 125 | 119 | 120 | 111 | 110 | 123 | 108 | 108 |
| 117 | 119 | 118 | 117 | 121 | 126 | 124 | 126 |
| 110 | 98  | 110 | 110 | 106 | 133 | 137 | 136 |
| 115 | 115 | 120 | 105 | 115 | 126 | 119 | 125 |
| 125 | 119 | 120 | 111 | 110 | 123 | 108 | 108 |
| 117 | 119 | 118 | 117 | 121 | 126 | 124 | 126 |

FIG. 12

MACRO BLOCK DATA OF Cb

| 139 | 141 | 136 | 139 | 143 | 137 | 134 | 133 |
|-----|-----|-----|-----|-----|-----|-----|-----|
| 138 | 137 | 131 | 141 | 139 | 132 | 134 | 130 |
| 132 | 135 | 131 | 136 | 142 | 133 | 130 | 125 |
| 126 | 125 | 124 | 132 | 135 | 127 | 126 | 126 |
| 139 | 141 | 136 | 139 | 143 | 137 | 134 | 133 |
| 138 | 137 | 131 | 141 | 139 | 132 | 134 | 130 |
| 132 | 135 | 131 | 136 | 142 | 133 | 130 | 125 |
| 126 | 125 | 124 | 132 | 135 | 127 | 126 | 126 |
| 139 | 141 | 136 | 139 | 143 | 137 | 134 | 133 |
| 138 | 137 | 131 | 141 | 139 | 132 | 134 | 130 |
| 132 | 135 | 131 | 136 | 142 | 133 | 130 | 125 |
| 126 | 125 | 124 | 132 | 135 | 127 | 126 | 126 |
| 139 | 141 | 136 | 139 | 143 | 137 | 134 | 133 |
| 138 | 137 | 131 | 141 | 139 | 132 | 134 | 130 |
| 132 | 135 | 131 | 136 | 142 | 133 | 130 | 125 |
| 126 | 125 | 124 | 132 | 135 | 127 | 126 | 126 |

FIG. 13

| N | 1 | 2 | 3 | 4 | 5 | 6 | 7 | 8 |
|---|---|---|---|---|---|---|---|---|
| QUANTIZED VALUE | 1 | 4 | 7 | 12 | 18 | 24 | 36 | 48 |

FIG. 14

| N | 1 | 2 | 3 | 4 | 5 | 6 | 7 | 8 |
|---|---|---|---|---|---|---|---|---|
| QUANTIZED VALUE | 1 | 4 | 7 | 12 | 18 | 24 | 36 | 48 |
| UNITS OF MACRO BLOCK (BIT) | 3512 | 1830 | 1390 | 1024 | 786 | 676 | 514 | 416 |
| UNITS OF GOP (BIT) | 7024 | 3660 | 2780 | 2048 | 1572 | 1352 | 1028 | 832 |

FIG. 15

| QUANTIZED VALUE | 18 | 20 | 22 | 24 |
|---|---|---|---|---|
| QUANTITY OF GENERATED CODES(BIT) IN UNITS OF MACRO BLOCK | 786 | 766 | 734 | 676 |

FIG. 16

| N | 1 | 2 | 3 | 4 | 5 | 6 | 7 | 8 |
|---|---|---|---|---|---|---|---|---|
| QUANTIZED VALUE | 1 | 4 | 7 | 12 | 18 | 24 | 36 | 48 |
| FIRST MACRO BLOCK | 2566 | 1818 | 1376 | 1026 | 764 | 732 | 668 | 338 |
| SECOND MACRO BLOCK | 2556 | 1704 | 1388 | 932 | 786 | 720 | 496 | 390 |
| UNITS OF GOP (BIT) | 5122 | 3522 | 2764 | 1958 | 1550 | 1452 | 1164 | 728 |

FIG. 17

| QUANTIZED VALUE | 18 | 20 | 22 | 24 |
|---|---|---|---|---|
| QUANTITY OF GENERATED CODES (BIT) IN UNITS OF MACRO BLOCK | 764 | 738 | 734 | 732 |

FIG. 18

| QUANTIZED VALUE | 18 | 20 | 22 | 24 |
|---|---|---|---|---|
| QUANTITY OF GENERATED CODES (BIT) IN UNITS OF MACRO BLOCK | 786 | 784 | 766 | 720 |

FIG. 19

| MACRO BLOCK No. | FIRST ENCODING | SECOND ENCODING |
|---|---|---|
| 1 | 2 2 | 2 2 |
| 2 | 1 8 | 2 0 |

FIG. 20

| MACRO BLOCK No. | FIRST ENCODING | SECOND ENCODING |
|---|---|---|
| 1 | 27.765 dB | 27.765 dB |
| 2 | 30.138 dB | 28.430 dB |

FIG. 21

| N | 1,2 | 2,3 | 3,4 | 4,5 | 5,6 | 6,7 | 7,8 |
|---|---|---|---|---|---|---|---|
| QUANTIZED VALUE | 1,4 | 4,7 | 7,12 | 12,18 | 18,24 | 24,36 | 36,48 |
| GRADIENT | 1121 | 293 | 146 | 79 | 36 | 27 | 16 |

FIG. 22

| N | 1 | 2 | 3 | 4 | 5 | 6 | 7 | 8 |
|---|---|---|---|---|---|---|---|---|
| QUANTIZED VALUE | 1 | 4 | 7 | 12 | 18 | 24 | 36 | 48 |
| UNITS OF GOP (BIT) | 7024 | 3660 | 2780 | 2048 | 1572 | 1352 | 1028 | 832 |

FIG. 23

| QUANTIZED VALUE | 18 | 20 | 22 | 24 |
|---|---|---|---|---|
| QUANTITY OF GENERATED CODES (BIT) IN UNITS OF MACRO BLOCK | 786 | 766 | 734 | 676 |

FIG. 24

| N | 1 | 2 | 3 | 4 | 5 | 6 | 7 | 8 |
|---|---|---|---|---|---|---|---|---|
| QUANTIZED VALUE | 1 | 4 | 7 | 12 | 18 | 24 | 36 | 48 |
| FIRST MACRO BLOCK | 2566 | 1818 | 1376 | 1026 | 764 | 732 | 668 | 338 |
| SECOND MACRO BLOCK | 2638 | 1760 | 1426 | 1018 | 770 | 750 | 692 | 360 |
| UNITS OF GOP (BIT) | 5204 | 3578 | 2793 | 2044 | 1534 | 1482 | 1360 | 698 |

FIG. 25

| N | 1, 2 | 2, 3 | 3, 4 | 4, 5 | 5, 6 | 6, 7 | 7, 8 |
|---|---|---|---|---|---|---|---|
| QUANTIZED VALUE | 1, 4 | 4, 7 | 7, 12 | 12, 18 | 18, 24 | 24, 36 | 36, 48 |
| GRADIENT | 542 | 261 | 149 | 85 | 8 | 10 | 55 |

FIG. 26

| N | 1 | 2 | 3 | 4 | 5 | 6 | 7 | 8 |
|---|---|---|---|---|---|---|---|---|
| QUANTIZED VALUE | 1 | 4 | 7 | 12 | 18 | 24 | 36 | 48 |
| UNITS OF GOP (BIT) | 5204 | 3578 | 2793 | 2044 | 1534 | 1482 | 1360 | 698 |

| QUANTIZED VALUE | 18 | 20 | 22 | 24 |
|---|---|---|---|---|
| QUANTITY OF GENERATED CODES (BIT) IN UNITS OF MACRO BLOCK | 764 | 738 | 734 | 732 |

| QUANTIZED VALUE | 16 | 18 | 20 | 22 | 24 |
|---|---|---|---|---|---|
| QUANTITY OF GENERATED CODES (BIT) IN UNITS OF MACRO BLOCK | 824 | 770 | 766 | 762 | 750 |

| MACRO BLOCK No. | FIRST ENCODING | SECOND ENCODING |
|---|---|---|
| 1 | 2 2 | 2 2 |
| 2 | 2 0 | 2 0 |

| MACRO BLOCK No. | FIRST ENCODING | SECOND ENCODING |
|---|---|---|
| 1 | 27.765 dB | 27.765 dB |
| 2 | 28.979 dB | 28.979 dB |

ENCODING METHOD AND ENCODER USING IT

This is a continuation of copending International Application PCT/JP98/02245 having an international filing date of May 22, 1998.

TECHNICAL FIELD

The present invention relates to an encoding method of input data for encoding input data such as a picture and an encoder using it.

BACKGROUND ART

When input data such as a picture are encoded, in an encoding method such as a moving picture experts group 2 (MPEG2), the quantity of codes generated in every group of pictures (GOP) is required to be controlled in units of encoding processing, for example, GOP, for the limitation such as package media and a capacity for communication, so that the above quantity is within the predetermined target quantity of codes.

There is difference between the target quantity of codes and the quantity of generated codes because quantization is discrete or the like, the difference resulting in the deterioration of the quality of a picture. Generally, to solve such a problem, a feedback control method of observing difference between the target quantity of codes and the quantity of generated codes, reflecting a differential value in the target quantity of codes of input data to be encoded after the observation and bringing the quantity of generated codes as close to the target quantity of codes as possible and others, is adopted.

FIG. 31 is a system diagram showing the main part of a conventional type encoder for executing such processing. For input data, image data are shown.

Input data supplied to a terminal 11 are supplied to discrete cosine transform (DCT) means 12 and is transformed to a DCT coefficient. The DCT coefficient is supplied to fixed quantizing means 14 and is quantized. In the quantizing means 14, plural quantizers, each of which is different in a quantized value, are provided. In the case of MPEG2, 31 quantized values are generated as a result of quantization, however, as the quantizing means 14 is used for calculating the optimum target quantity of codes, the smaller number of quantizers are actually used.

In this example, N (for example, N=8) pieces of quantizers 14a to 14h, each of which is different in a quantized value, are used as shown in FIG. 32. The quantity of generated codes of a quantized DCT coefficient is calculated in arithmetic means 16 in the respective quantized values of units of GOP and of units of macro block that is the minimum unit of encoding. Therefore, this arithmetic means 16 is also composed of eight arithmetic units 16a to 16h, as shown in FIG. 32.

The quantity of generated codes in units of GOP and in units of macro block is supplied to target code quantity allocating means (target code quantity determining means) 18 and the target quantity of codes TMB (TMBb) to be the quantity of codes every macro block (a target bit rate) is allocated based upon the predetermined target quantity of codes TMB in units of GOP.

The target quantity of codes TMBb and the DCT coefficient are supplied to Q search means 30 and then the minimum quantized value not exceeding the target quantity of codes TMB acquired every macro block is acquired by an operation. The minimum quantized value and the DCT coefficient are supplied to back search means 32. The means 32 is a block processed according to back search algorithm for preventing the quality of a picture from being deteriorated in encoding/decoding and in the means, a final quantized value for quantization is selected.

The quantized value is supplied to quantizing means 34 and a DCT coefficient is quantized. The quantized DCT coefficient is converted to a variable length code VLC according to the frequency of generation by variable length coding means 36.

As quantization for a DCT coefficient is discrete or a quantized value selected by the Q search means 30 is replaced with a quantized value when the back search algorithm of the back search means 32 is first encoded, the target quantity of codes TMB allocated by the target code quantity allocating means 18 and the quantity of generated codes every macro block generated by the variable length coding means 36 are not necessarily equal.

Therefore, the variable length coding means 36 further feeds a differential value DF between the target quantity of codes TMB every macro block and the actual quantity of generated codes back to the target code quantity allocating means 18.

The quantity of generated codes is brought closer to the target quantity of codes by adding the differential value DF in units of GOP which is the same unit as the target quantity of codes and adding the added differential value to the target quantity of codes TMB of a macro block to be encoded after that in units of GOP.

FIG. 33 shows a concrete example of the target code quantity allocating means 18. As shown in FIG. 33, interpolating means 22 judges which of the quantity of generated codes in units of GOP respectively from eight fixed quantizers 14a to 14h the target quantity of codes TMB in units of GOP is, and it interpolates and outputs the minimum quantized value not exceeding the target quantity of codes.

An allocator 24 allocates the target quantity of codes TMBa every macro block based upon a quantized value acquired by interpolation processing and the quantity of generated codes in units of macro block from two fixed quantizers respectively adjacent to the above quantized value. Actually, the allocator acquires the target quantity of codes every macro block by calculation.

Feedback quantity determining means 26 adds a differential value DF from the variable length coding means 36 in units of GOP which is the same unit as the unit of the target quantity of codes. Adding output DF is output until the value exceeds a feedback threshold FBT (a fixed value). As a limiter is operated when the value exceeds the feedback threshold FBT, a fixed feedback threshold FBT is output.

Adding means 28 outputs a value acquired by adding a feedback value FB to the target quantity of codes TMBa every macro block to be encoded after that in units of GOP which is the same unit as the target quantity of codes, as the target quantity of codes TMBb every macro block.

Heretofore, as a fixed feedback threshold FBT is used, the quantity of generated codes in units of GOP never exceeds the target quantity of codes TMBb. This is because the target code quantity allocating means 24 allocates the target quantity of codes to all macro blocks in each GOP.

Feedback quantity means quantity acquired by limiting with a feedback threshold FBT the difference DF, added every GOP which is the same unit as the target quantity of codes, between the target quantity of codes TMBa allocated every macro block and the quantity of generated codes quantized at a quantized value not exceeding the target quantity of codes. As long as the interpolating means 22 selects the minimum quantized value not exceeding the target quantity of codes in units of GOP, the quantity of generated codes in units of GOP never exceeds the target quantity of codes even if such feedback control is executed.

As described above, in the conventional type encoding method, as a threshold is determined independent of the character of input image data though the threshold can be set as a feedback value from an external device, there is a problem that the quality of a picture is remarkably deteriorated when encoding/decoding is repeated.

The present invention is made to solve such conventional type problems and the object is to provide an encoding method and an encoder using it in which the quality of a picture is never deteriorated even if encoding/decoding is repeated.

DISCLOSURE OF THE INVENTION

An encoding method according to the present invention is based upon an encoding method in which the quantity of generated codes in units of encoding processing is required to be controlled so that the above quantity is within the predetermined target quantity of codes in units of predetermined encoding processing and is characterized in that the quantity of generated codes can be brought close to the target quantity of codes by feeding a differential value between the quantity of generated codes and the target quantity of codes back to target code quantity allocating means, automatically judging whether input data are encoded/decoded in the past or not and determining a feedback threshold to be added to the above target quantity of codes based upon the result of the above judgment.

An encoder according to the present invention is based upon an encoder provided with target code quantity allocating means for bringing the quantity of actually generated codes close to the target quantity of codes when input data are compressed and encoded and is characterized in that judging means for automatically judging whether input data are encoded/decoded in the past or not based upon the quantity of generated codes in units of GOP from N (N: an integer) pieces of fixed quantizers and feedback control means for estimating the character of the above input data using the quantity of generated codes in units of GOP from the above N pieces of fixed quantizers and the result of the above judgment and calculating a feedback threshold to be added to the above target quantity of codes based upon the result of the estimate are provided.

In the encoding method and the encoder respectively according to the present invention, it is automatically judged, based upon the quantity of generated codes from plural fixed quantizers for estimating the quantity of codes, whether input data are encoded/decoded in the past or not and if the input data are not encoded/decoded based upon the result of the judgment, feedback control depending upon the character of the input data are executed. Conversely, if the input data are encoded/decoded in the past, feedback control regarding repeatability as important is executed.

The quantity of generated codes is brought close to the target quantity of codes by executing such feedback control depending upon the character of input data and the deterioration of the quality of a picture is inconspicuous even if encoding/decoding is repeated.

BRIEF DESCRIPTION OF THE DRAWINGS

FIG. 5 is a flowchart showing an example for determining a first feedback threshold.

FIG. 8 is its operational explanatory diagram.

FIG. 10 is a diagram showing the macro block data of Y signal.

FIG. 11 is a diagram showing the macro block data of Cr signal.

FIG. 12 is a diagram showing the macro block data of Cb signal.

FIG. 13 is a chart showing relationship among typical eight fixed quantized values.

FIG. 14 is a chart showing relationship between each of eight quantized values and the quantity of generated codes at that time.

FIG. 15 is a chart extracted from FIG. 14 in which the quantity of generated codes at a quantized value "22" is acquired.

FIG. 16 is a chart showing relationship between each of eight quantized values and the quantity of generated codes at that time.

FIG. 17 is a chart extracted from FIG. 16 in which the quantity of generated codes at a quantized value "20" is acquired.

FIG. 18 is a chart showing relationship between each of eight quantized values and the quantity of generated codes at that time.

FIG. 19 is a chart showing relationship between encoding twice and a quantized value at that time.

FIG. 20 is a chart showing conventional type relationship in signal-to-noise ratio (SNR).

FIG. 21 is a chart for acquiring the gradient of the quantity of generated codes.

FIG. 22 is a chart showing relationship between each of eight quantized values and the quantity of generated codes at that time.

FIG. 23 is a chart extracted from FIG. 22 for acquiring the quantity of generated codes at a quantized value "22".

FIG. 24 is a chart showing relationship among the quantity of generated codes in second encoding.

FIG. 25 is a chart for acquiring the gradient of the quantity of generated codes.

FIG. 26 is a chart showing relationship between each of eight quantized values and the quantity of generated codes at that time.

BEST EMBODIMENTS OF THE INVENTION

Figure 1:
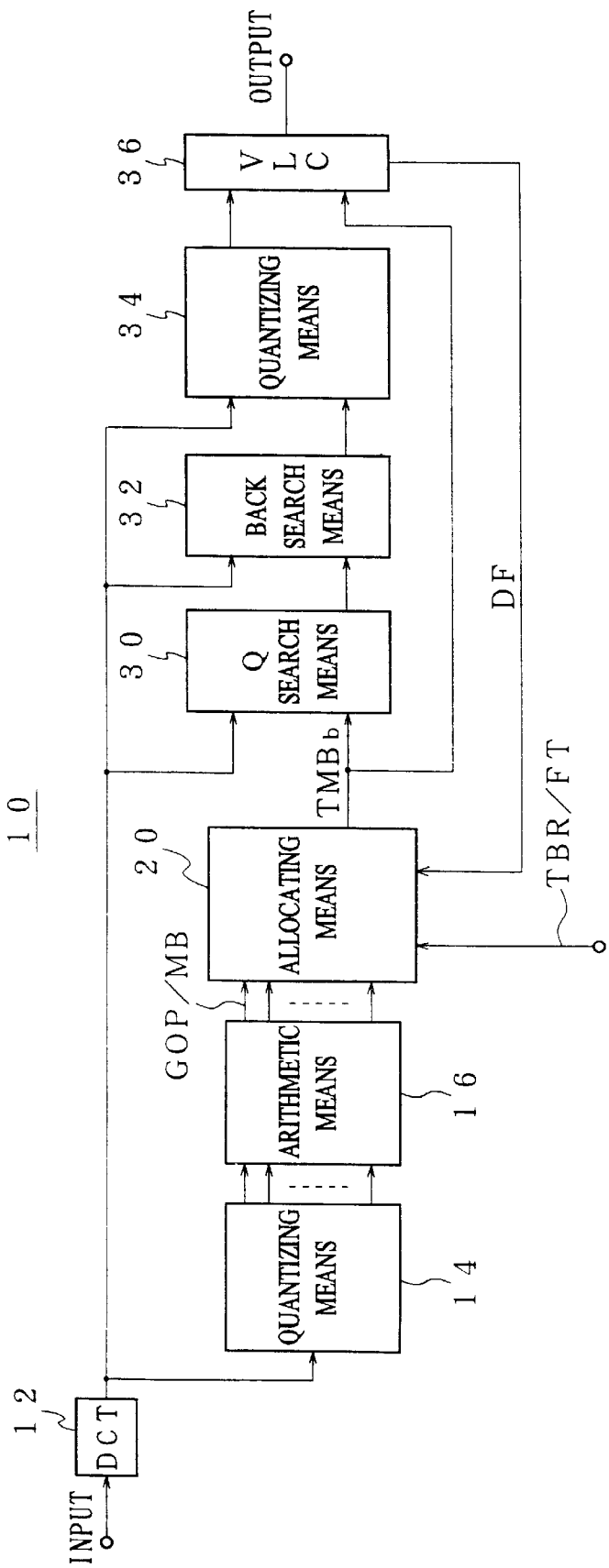
FIG. 1 is a system diagram showing the main part of an embodiment of an encoder to which an encoding method according to the present invention is applied.

Next, referring to the drawings, embodiments of an encoding method according to the present invention and an encoder using it will be described in detail. However, in this example, input data are also image data and MPEG2 is used for encoding means.

Figure 31:
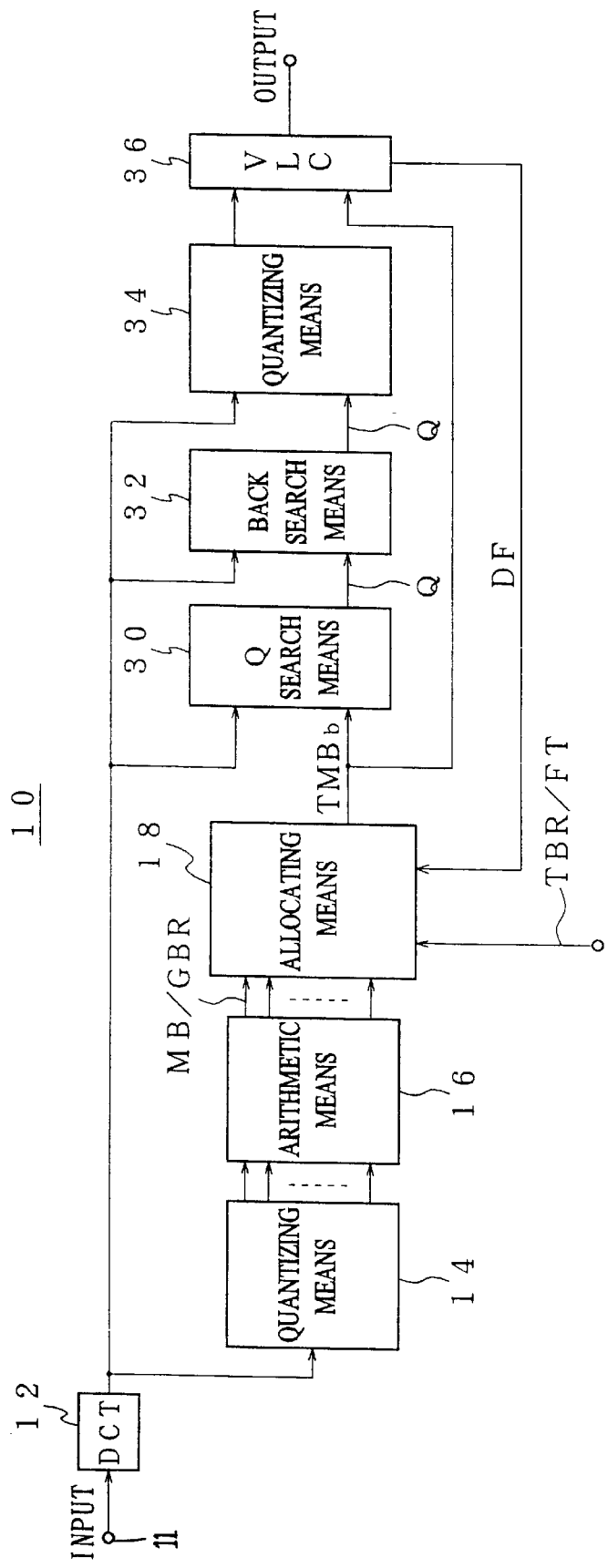
FIG. 31 is a system diagram showing a conventional type encoder.
Figure 33:
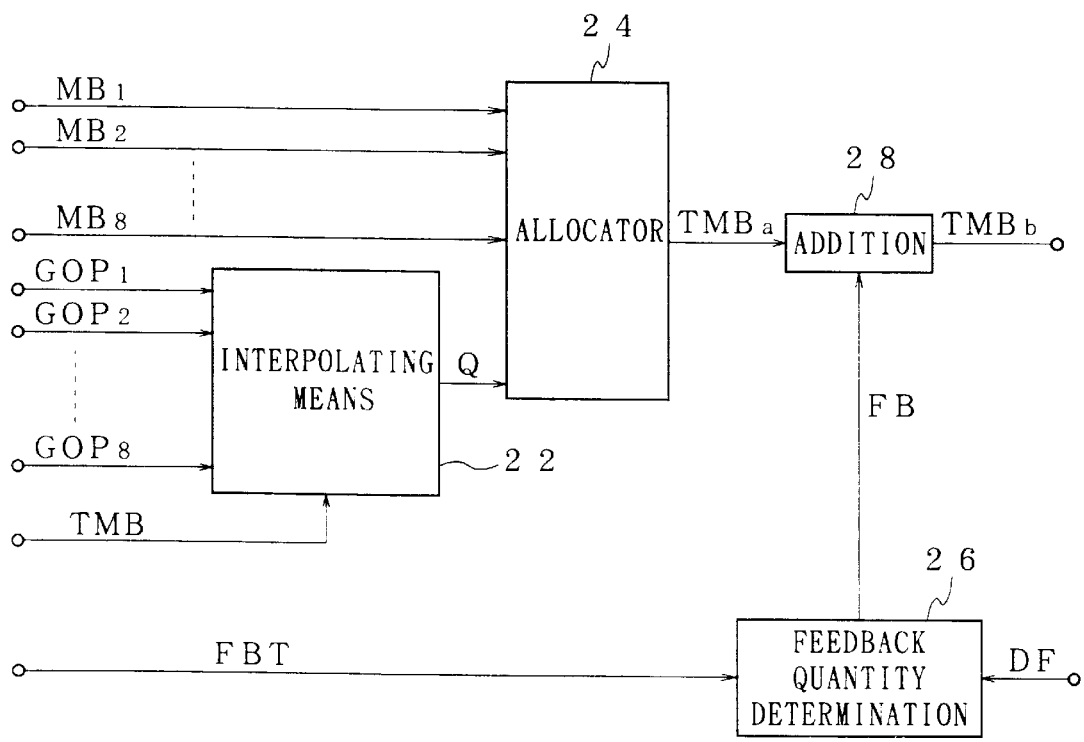
FIG. 33 is a system diagram showing target code quantity allocating means.

FIG. 1 shows an embodiment of an encoder 10 to which an encoding method according to the present invention is applied. The basic constitution in this embodiment is the same as in the example of the conventional type as shown in FIG. 31, and it is only in target code quantity allocating means 20 that this embodiment is greatly different from the example of the conventional type when the same reference number is allocated to the same part. Therefore, the description of the basic constitution and the operation is omitted.

Figure 2:
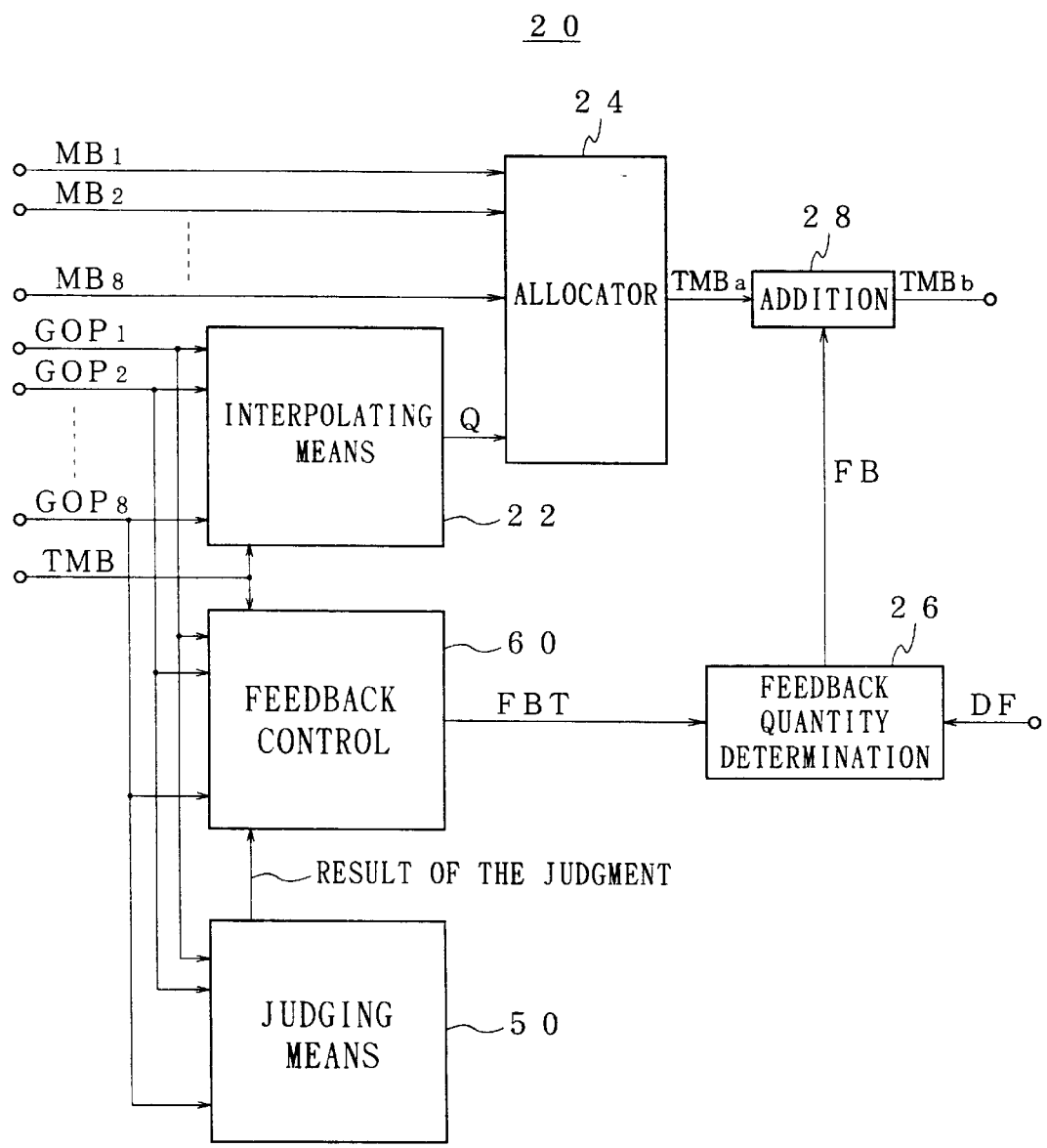
FIG. 2 is a system diagram showing the constitution of the main part of target code quantity allocating means.
Figures 27, 28, 29, 30, 32:
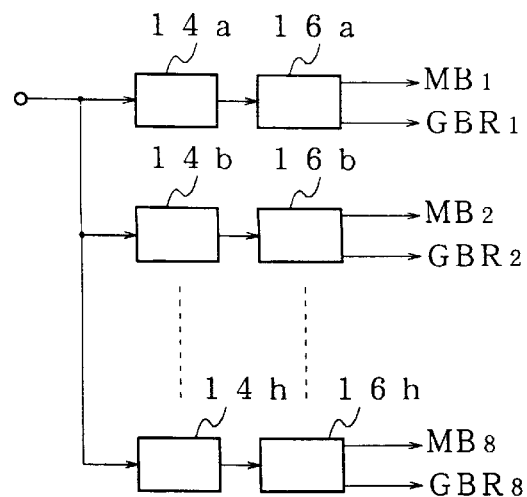
FIG. 27 is a chart extracted from FIG. 26 in which the quantity of generated codes at a quantized value "22" is acquired.
FIG. 28 is a chart extracted from FIG. 26 in which the quantity of generated codes at a quantized value "22" is acquired.
FIG. 29 is a chart showing relationship between encoding twice and a quantized value at that time.
FIG. 30 is a chart showing relationship in SNR according to the present invention.
FIG. 32 is a system diagram showing relationship between fixed quantizing means and operation means.

FIG. 2 shows a concrete example of the target code quantity allocating means 20. The allocating means 20 is provided with judging means 50 and feedback control means 60 in addition to interpolating means 22, an allocator 24, feedback quantity determining means 26 and adding means 28, as shown in FIG. 32.

The judging means 50 judges whether input data are encoded/decoded in the past or not. The quantity of generated codes in units of GOP from the N (N=8) pieces of fixed quantizers 14a to 14h and the target quantity of codes TMB in units of macro block are supplied to the judging means, as shown in FIG. 2, and the judging means is composed of a microprocessor for automatically judging whether input data are encoded/decoded in the past or not based upon these results.

Not only the quantity of generated codes in units of GOP from the eight fixed quantizers 14a to 14h is supplied to the feedback control means 60 but the result of the judgment by the judging means 50 is also supplied to it. The feedback control means is composed of a microprocessor for estimating the character of input data referring the result of the judgment and determining a feedback threshold FBT by using the result of the estimate, the quantity of generated codes and the target quantity of codes.

Figure 3:
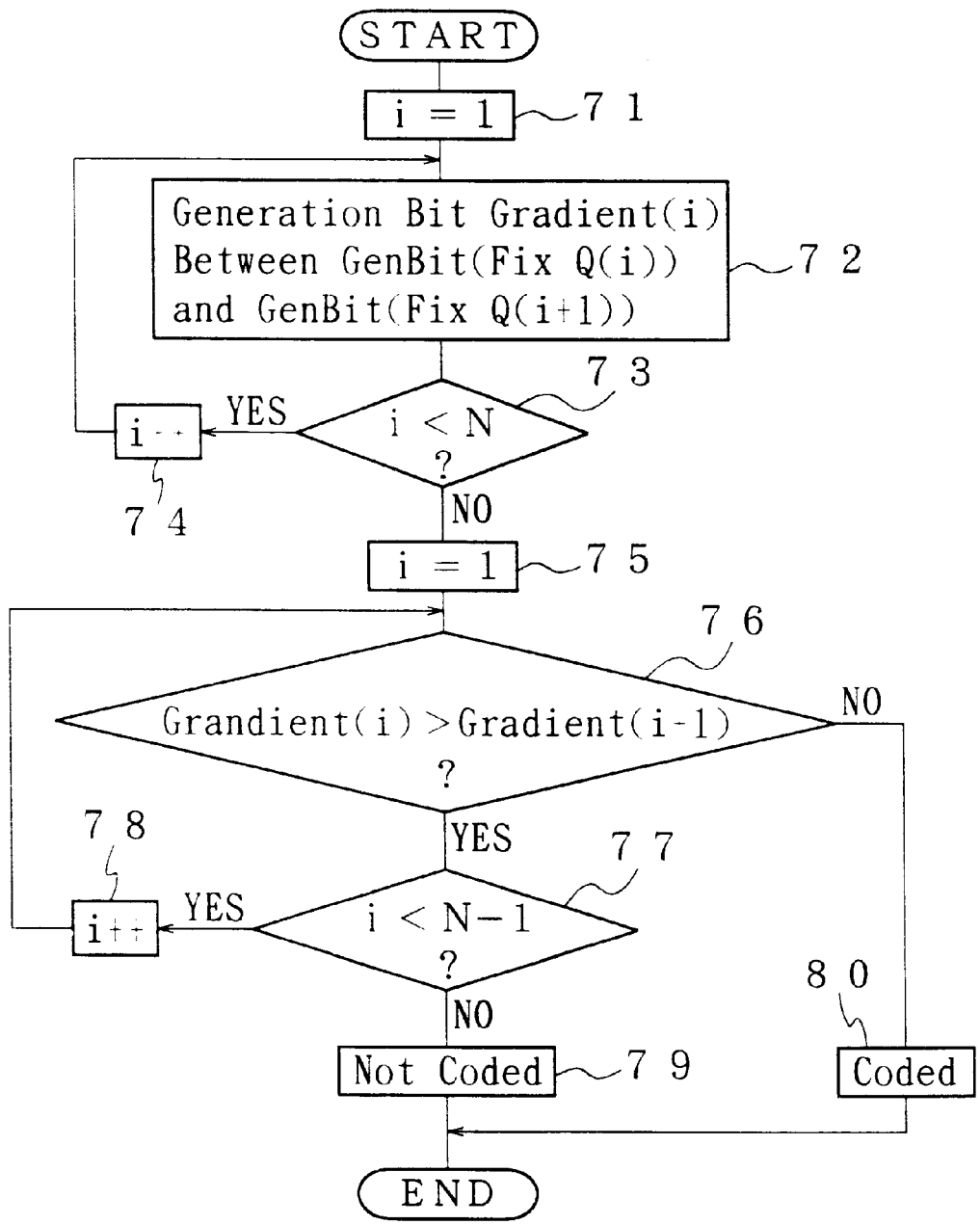
FIG. 3 is a flowchart showing an example of code quantity allocating processing.

Referring to FIG. 3, the operation of the judging means 50 will be described below. When the respective quantized values by the eight fixed quantizers 14a to 14h are FixQ (i)(i=1, 2, ..., 8), $$FixQ\ (i) < FixQ\ (i+1) \tag{1}$$

wherein i=1, ..., 7.

Then, the gradient of the quantity of generated codes among the fixed quantized values is acquired based upon the quantity of generated codes (GenBit (FixQ (i)), i=1, 2, ..., 8) in units of GOP at the respective quantized values. It is judged based upon the gradient whether input image data are encoded/decoded in the past or not.

First, in a step 71 shown in FIG. 3, "i" is initialized and next, in a step 72, the gradient (GD (i), i=1, ..., 7) of the quantity of generated codes is calculated. For example, a computational expression is as follows:

$$GD\ (i) = (GenBit\ (FixQ\ (i)) - GenBit\ (FixQ\ (i+1)))\ (FixQ\ (i+1) - FixQ\ (i)) \times (Number\ of\ macro\ blocks\ in\ GOP) \tag{2}$$

Gradients between eight fixed quantizers 14a to 14h are acquired based upon the expression (2). Therefore, "i" is incremented until "i" is 8 in steps 73 and 74. If all the gradients between the fixed quantizers 14a and 14h are acquired, "i" is initialized in a step 75 and it is checked in a step 76 whether relationship between each gradient monotonously varies or not, monotonously decreases (GD (i)>GD (i+1)) or not as "i" is increased in this example.

If the relationship monotonously varies, the similar judgment is sequentially made incrementing "i" in steps 77 and 78 and when any relationship monotonously varies, it is judged in a step 79 that the input image data are never encoded/decoded in the past. If the relationship does not vary monotonously, it is judged in a step 80 that the input image data are encoded/decoded in the past.

Figure 4:
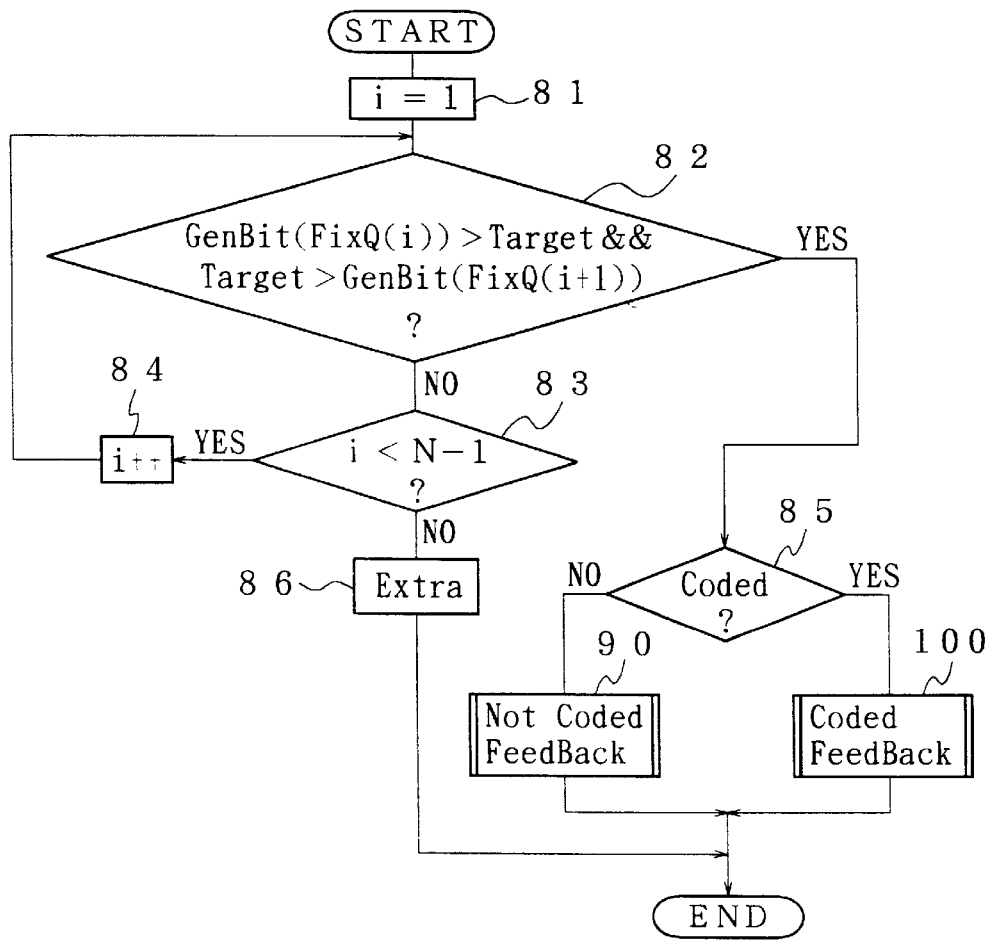
FIG. 4 is a flowchart showing an example of encoding/decoding judging processing.

The feedback control means 60 estimates the character of input image data as described above and determines a feedback threshold based upon the result of the estimate. Referring to FIG. 4, the above will be described below.

First, after "i" is initialized in a step 81, relationship between the target quantity of codes TMB in units of GOP and each quantity of generated codes in units of GOP from the eight fixed quantizers 14a to 14h is checked and the quantity of generated codes, GenBit (FixQ (i)) and GenBit (FixQ (i+1)) from two fixed quantizers adjacent to the target quantity of codes are found. That is, a quantized value acquired in the following expression is found incrementing "i" in steps 82, 83 and 84.

$$GenBit\ (FixQ\ (i)) > Target\ quantity\ of\ codes > GenBit\ (FixQ\ (i+1)) \tag{3}$$

Next, when the quantity of generated codes which meets the expression (3) is detected, the result of the judgment of whether input image data are encoded/decoded or not is referred in a step 85. When input image data are not encoded/decoded, computational algorithm for acquiring a feedback threshold when it is not encoded/decoded is executed in a step 90. When input image data are encoded/decoded, computational algorithm for acquiring a feedback threshold when it is encoded/decoded is executed in a step 100.

If the quantity of generated codes from two adjacent to the target quantity of codes of the eight fixed quantizers 14a to 14h cannot be found in a step 82, the target quantity of codes of input data are extremely many or small. In this case, for example, exceptional processing in a step 88 as in the conventional type method is executed. The target quantity of codes or eight fixed quantized values is/are required to be determined so that such a situation can be originally avoided.

FIG. 5 shows an example of a subroutine activated in the step 90 shown in FIG. 4. In algorithm for calculating a feedback threshold shown in FIG. 5, relationship between two fixed quantized values FixQ (i) and FixQ (i+1) selected in the step 82 shown in FIG. 4 is checked.

It is judged in a step 91 whether the relationship is the minimum quantization step (==minQ step) defined as an encoding method or not. If relationship between FixQ (i) and FixQ (i+1) is the minimum quantization step (FixQ (i+1)−FixQ (i)==minQ step), the quantized values FixQ (i) and FixQ (i+1) respectively selected in the step 82 are used as they are as a quantization step after interpolation (InterpQ (j)) in a step 92.

Conversely, if relationship between FixQ (i) and FixQ (i+1) is not the minimum quantization step, a quantization step (InterpQ (j)) to be the minimum quantization step between FixQ (i) and FixQ (i+1) is acquired by following interpolation in steps 93 and 94.

$$\text{InterpQ (j)} == \text{FixQ (i)}$$

$$\text{InterpQ (j+x)} == \text{FixQ (i+1)}$$

$$\text{InterpQ (k+1)} - \text{InterpQ (k)} == \text{minQ step} \qquad (4)$$

Wherein k=j, . . . , j+X−1.

The quantity of generated codes in units of GOP for InterpQ (j) is acquired based upon GenBit (FixQ (i) ) and GenBit (FixQ (i+1) ) by interpolation. In this case, the above quantity of generated codes is acquired by linear interpolation as follows:

$$\begin{aligned}\text{GenBit (interpQ (y))} = \quad &(5)\\ \text{GenBit (FixQ (i + 1))} + \{((j + X - 1) - y)/((j + X - 1) - j)\} * \\ &(\text{GenBit(FixQ (i))} - \text{GenBit (FixQ (i + 1))})\end{aligned}$$

wherein, y=j, j+1, . . . , j+X−1.

The "j" such that relationship between the quantity of generated codes in units of GOP acquired by the above interpolation and the target quantity of codes in units of GOP is equal to relationship in the following expression, is found in a step 95.

$$\text{GenBit (InterpQ (j))} > \text{Target quantity of codes} > \text{GenBit (InterpQ (j+1))} \qquad (6)$$

Relationship between InterpQ (j) and InterpQ (j+1) which respectively meet the expression (6) is the minimum quantization step.

A feedback threshold is calculated based upon IterpQ (j) and InterpQ (j+1) respectively determined in the step 92 or 95, in addition to the quantity of generated codes, in units of GOP, GenBit (InterpQ (j)) and GenBit (InterpQ (j+1)) and the target quantity of codes in units of GOP in a step 97.

In the step 97, certain functions UNC=f (x) and LNC=g (x) are defined using the following expressions:

$$\text{UNC} = f\ ((\text{GenBit (InterpQ (j))} - \text{target quantity of codes})/(\text{Number of macro blocks in units of GOP})); \qquad (7)$$

$$\text{LNC} = g\ ((\text{target quantity of codes} - \text{GenBit (InterpQ (j+1))})/(\text{Number of macro blocks in units of GOP})). \qquad (8)$$

In the step 97, the above calculation is executed and a feedback threshold FBT is acquired in the following expression:

$$\text{Feedback} = \text{FNC (UNC, LNC)}. \qquad (9a)$$

Figure 6:
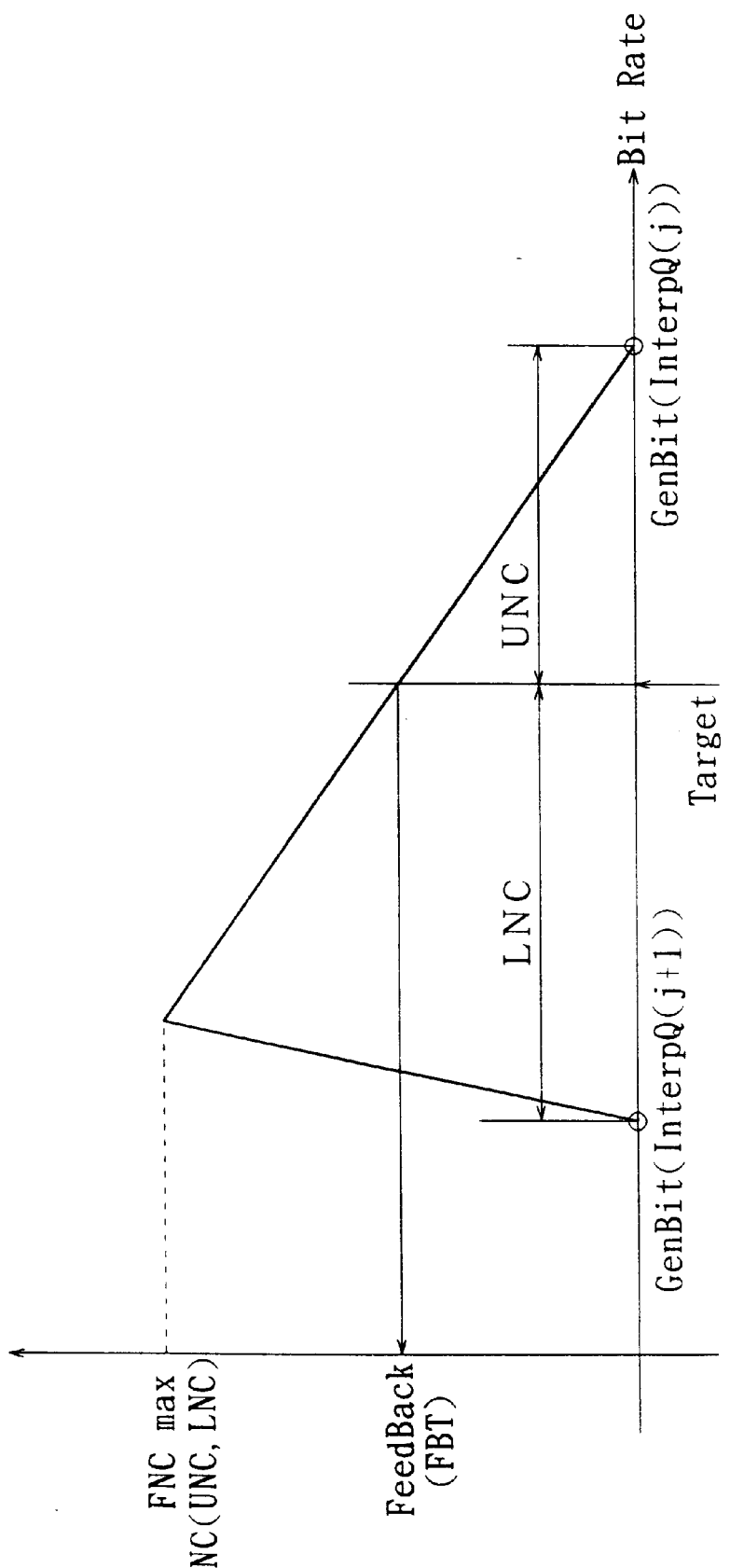
FIG. 6 is its operational explanatory diagram.

For example, concretely, in the following case, FNC () is as shown in FIG. 6:

$$f\ (x) = (\text{Number of macro blocks in units of GOP}) * x; \qquad (9b)$$

$$g\ (x) = (\text{Number of macro blocks in units of GOP}) * x. \qquad (9c)$$

As clear from FIG. 6, as the value of UNC is increased, a feedback threshold becomes large and as the value of LNC is decreased, a feedback threshold is decreased. The value of the smaller of the feedback thresholds FBT and a differential value DF is used as output (feedback quantity FB) from the feedback quantity determining means 26.

The target quantity of codes of each macro block can be controlled by using such computational algorithm so that the target quantity of codes varies in the minimum quantization step between (InterpQ (j) and InterpQ (j+1)). When the target quantity of codes is controlled so that it varies in the minimum quantization step, a quantized value is stable. As the computational algorithm is started from the quantity of generated codes from the eight fixed quantizers 14a to 14h based upon input data, the character of the input image data can be precisely reflected.

Figure 7:
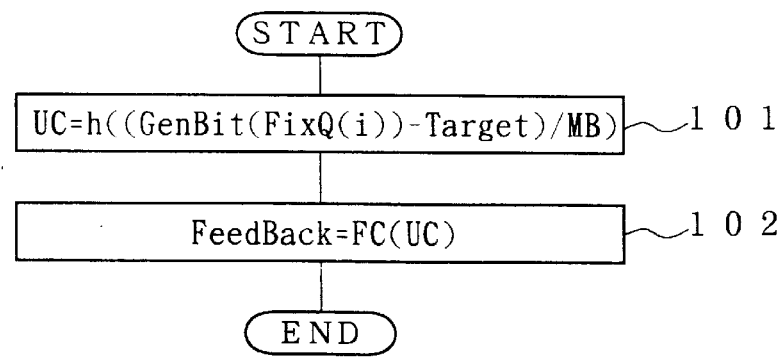
FIG. 7 is a flowchart showing an example for determining a second feedback threshold.

FIG. 7 shows a concrete example of computational algorithm in the subroutine step 100 shown in FIG. 4. First, the following function h (x), for example, is defined based upon FixQ (i) which is one of the two fixed quantizers selected in the step 82 shown in FIG. 4 and the target quantity of codes in units of GOP in a step 101:

$$\text{UC} = h\ ((\text{GenBit (FixQ (i))} - \text{target quantity of codes}) / (\text{Number of macro blocks in units of GOP})). \qquad (10a)$$

Next, the above expression (10a) is calculated and a value acquired in the following expression (10b) is defined as a feedback threshold FBT in a step 102:

$$\text{Feedback} = \text{FC (UC)}. \qquad (10b)$$

For example, concretely, FC () is made as shown in FIG. 8, in the case of the following expression (10c):

$$h\ (x) = (\text{Number of macro blocks in units of GOP}) * x. \qquad (10c)$$

As the value of UC is increased, a feedback threshold becomes large.

Differently from the above FNC (), even if UC is zero, a positive value S is given to a feedback threshold without giving zero to the feedback threshold. An element such as LNC that reduces a feedback threshold cannot be introduced. The reason is as follows:

If a feedback threshold is as shown in FIG. 5, it is difficult to find a quantized value in first encoding in algorithm by back search means 32; In the encoding according to the present invention in which the quantity of generated codes should not exceed the target quantity of codes, there is a major premise that the minimum quantized value not exceeding the target quantity of codes is required to be selected; and After back search algorithm is finished, the major premise is also naturally required to be met.

In the back search algorithm, M steps of quantization (Q (i), i=1, 2, . . . , M) are executed, the minimum quantized value Q (j) out of the remainder in the above quantization is found and is judged a value quantized in first encoding.

However, there may be also no difference in the remainder in M steps of quantization due to an effect such as noise. In such a case, in the back search algorithm, a quantized value is not varied.

In such back search algorithm, even after processing in the back search means 32 is finished, the minimum quantized value in M steps of quantization not exceeding the target quantity of codes is required to be selected to meet the major premise. M steps of quantization are executed from the minimum quantized value in a direction in which a quantized value increases and a quantized value at which the remainder is minimum is found.

In other words, to find a quantized value in first encoding in back search algorithm, meeting the major premise, the target quantity of codes is required to be suitably increased so that the above target quantity of codes exceeds the quantity of generated codes at a quantized value first encoded.

To execute the above effectively, a feedback threshold FBT is required to be a certain positive value S even if UC is zero and as a differential value DF between the target quantity of codes from the variable length coding means 36 obtained by securely detecting a quantized value in first encoding in back search algorithm and the quantity of generated codes increases, a feedback threshold is not required to be reduced by introducing LNC.

As the target quantity of codes in units of macro block exceeds the quantity of generated codes at a quantized value in first encoding owing to this algorithm and as a result, the back search algorithm can be sufficiently utilized, deterioration when encoding/decoding is repeated can be prevented.

Next, difference between prior art and present invention will be described based upon a concrete example. FIGS. 10 to 12 respectively show Y signal, Cr signal and Cb signal of the macro block data of an input picture as the premise. The drawings show repetition in units of four lines. Two macro blocks MB compose one GOP. The target quantity of codes in units of GOP is 1520 bits. A feedback threshold in the conventional type method is a fixed value composed of 30 bits. The conventional type example will be described below.

(1) First encoding (1a) Value quantized by a fixed quantizer 14

Thirty-one quantized values can be selected in MPEG2. The thirty-one quantized values are exemplified as "1, 2, 3, 4, 5, 6, 7, 8, 10, 12, 14, 16, 18, 20, 22, 24, 28, 32, 36, 40, 44, 48, 52, 56, 64, 72, 80, 88, 96, 104 and 112".

To control the quantity of generated codes GMB within the target quantity of codes in units of GOP, each quantity of generated codes in units of GOP and in units of macro block is acquired in the fixed quantizer 14 beforehand and the quantity of codes is allocated using the above quantity of generated codes. In the fixed quantizer 14, it is the best to be provided with all the thirty-one quantizers, however, to reduce circuitry, eight typical quantized values are selected where N=8 is selected and the quantity of generated codes in units of GOP and in units of macro block at the eight quantized values is acquired.

The thirty-one quantizers for quantizing a DCT coefficient at the above thirty-one different quantized values are provided to Q search means 30.

When eight fixed quantized values are selected as shown in FIG. 13 the quantity of generated codes from each fixed quantizer 14 is made as shown in FIG. 14. As two macro blocks compose one GOP, the unit of GOP shown in FIG. 14 is equivalent to the double of the unit of macro block.

(1b) Target quantity of codes and the allocation of the quantity of codes

When two quantized values adjacent to 1520 bits which are the target quantity of codes in units of GOP are acquired based upon the quantity of generated codes in units of GOP from the eight (N=8) fixed quantizers 14 because the target quantity of codes TMB in units of GOP is 1520 bits, the quantized values are "18" and "24" as clear from FIG. 14.

A quantized value Q corresponding to 1520 bits which are the target quantity of codes in units of GOP is acquired by linear approximation based upon each quantity of generated codes in units of GOP at the two quantized values "18" and "24" as follows:

$$Q = 18 + [(1520 - 1352)/(1572 - 1352)] \times (24 - 18) = 22.582 \qquad (11)$$

Further, the target quantity of codes Target-MB (TMB) in units of macro block is linearly approximated by using the quantized value Q (=22.582) acquired in the expression (11), based upon each quantity of generated codes in units of macro block at the two quantized values, "18" and "24" as follows:

$$\text{Target} - MB = TMBa \qquad (12)$$
$$= 676 + [(22.582 - 18)/(24 - 18) \times (786 - 676)]$$
$$= 760 \text{ bits.}$$

(1c) A feedback threshold is a predetermined fixed value (30 bits in this example).

(1d) First macro block

The target quantity of codes (output from the allocating means 24) in units of macro block is Target-MB (=760 bits). As the second adding means 28 is initialized and is zero, the feedback value output from the first adding means 26 is also zero. Therefore, the second adding means 28 executes calculation as follows:

$$TMBb = TMBa + FB = 760 + 0 = 760 \text{ bits} \qquad (13)$$

and thus they become the target quantity of codes TMBb output in feedback control.

The Q search means 30 acquires a quantized value such that the quantity of generated codes in unit of macro block does not exceed 760 bits. As quantized values and the quantity of generated codes in units of macro block are as shown in FIG. 15 when they are actually extracted, value, "22" is selected as a quantized value not exceeding 760 bits.

The back search means 32 sums the remainder after the quantization of a DCT coefficient in units of macro block at quantized values including the quantized value acquired from the Q search means 30 or a larger value and acquires a quantized value in first encoding based upon relationship (for example, the maximum value is equivalent to 10 times or more of the minimum value) between the maximum value and the minimum value of the sum.

The minimum value of the sum is 122 bits when a quantized value is "22" and the maximum value of the sum is 917 bits when a quantized value is "112". As the maximum value is equivalent to 7.52 times of the minimum value, the output, "22" of a quantized value from the Q search means 30 is set as the output from the back search means 32.

Quantizing means 34 quantizes a DCT coefficient using the quantized value, "22" output from the back search means 32.

The variable length coding means (VLC) 36 generates a variable length code based upon the quantized DCT coefficient. The variable length coding means also acquires difference DF between the target quantity of codes TMBb in units of macro block and the quantity of codes actually generated by the variable length coding means 36 and feeds the difference back to the allocating means 20.

As the quantity of generated codes in units of macro block at a quantized value, "22" is 734 bits as shown in FIG. 15, a differential value DF between the quantity of generated codes and the target quantity of codes TMBb (=760 bits) in units of macro block is acquired in the following expression;

$$DF = 760 - 734 = 26 \text{ bits} \quad (14)$$

and the differential value is output to the allocating means 20.

(1e) Second macro block

The target quantity of codes TMBb in units of macro block is based upon the above expression (12) as follows:

$$TMBb = Target\text{-}MB = 760 \text{ bits.} \quad (15A)$$

As clear from the above expression (14), the first adding means 26 has twenty six bits which are equivalent to a differential value DF in a first macro block between the target quantity of codes TMBb and the quantity of generated codes respectively in units of macro block. As a feedback threshold is 30 bits as described above, the output of the first adding means 26 is 26 bits. As 26 bits are already output from the first adding means 26 as its feedback value, the output is zero bit as a result. In the second adding means 28, the target quantity of codes TMBb after feedback control is as follows:

$$TMBb = 760 + 26 = 786 \text{ bits.} \quad (15B)$$

The Q search means 30 acquires a quantized value such that the quantity of generated codes in units of macro block does not exceed 786 bits. As actually shown in FIG. 15 in which quantized values and the quantity of generated codes in units of macro block are extracted, the value, "18" is selected as a quantized value such that the quantity of generated codes does not exceed 786 bits.

In the back search means 32, the remainder after the quantization of a DCT coefficient in units of macro block at quantized values including the quantized value acquired from the Q search means 30 as described above or a larger value is summed and a quantized value in first encoding is acquired based upon relationship between the maximum value and the minimum value of the sum.

When a quantized value is "18", the minimum value of the sum is 73 bits and when a quantized value is "112", the maximum value of the sum is 917 bits. As the maximum value is equivalent to 12.56 times of the minimum value, the output, "18" of a quantized value from the Q search means 30 is set as the output from the back search means 32.

In the quantizing means 34, a DCT coefficient is quantized using the quantized value, "18" output from the back search means 32.

In the variable length coding means (VLC) 36, a variable length code is generated based upon the quantized DCT coefficient. Difference DF between the target quantity of codes TMBb in units of macro block and the quantity of codes actually generated in the variable length coding means 36 is acquired and is fed back to the allocating means 20.

As the quantity of generated codes in units of macro block at the quantized value, "18" is 786 bits as clear from FIG. 15, the differential value DF between the above quantity and the target quantity of codes TMBb (=786 bits) in units of macro block is calculated as follows:

$$DF = 786 - 786 = 0 \text{ bit} \quad (16)$$

and the differential value DF is output to the allocating means 20.

First encoding is finished by the above processing. VLC acquired from the variable length coding means 36 is decoded and next, second encoding is executed.

(2) Second encoding (2a) Value quantized by the fixed quantizer 14

In the same way as in first encoding, eight fixed quantized values are selected out of thirty-one quantized values as shown in FIG. 13. These quantized values are the same values as in first encoding. FIG. 16 shows the quantity of generated codes from each fixed quantizer 14 at this time. The reason why a first macro block and a second macro block are different in the quantity of generated codes as shown in FIG. 16 is that the quantized values for the respective macro blocks in first encoding are different as "22" and "18".

(2b) Target quantity of codes and the allocation of the quantity of codes

As the target quantity of codes TMB in units of GOP is 1520 bits, two quantized values adjacent to 1520 bits which are the target quantity of codes TMB in units of GOP are acquired based upon the quantity of generated codes in units of GOP from the eight (N=8) fixed quantizers 14 and they are "18" and "24" as shown in FIG. 14.

A quantized value Q corresponding to 1520 bits which are the target quantity of codes in units of GOP is acquired by linear approximation based upon each quantity of generated codes in units of GOP at these two quantized values, "18" and "24", as follows:

$$Q = 18 + [(1520-1452)/(1550-1452)] \times (24-18) = 22.163 \quad (17)$$

Further, the target quantity of codes Target-MB (TMB) in units of macro block is linearly approximated by using the quantized value Q (=22.163) acquired in the above expression (17), based upon each quantity of generated codes in units of macro block at the two quantized values "18" and "24".

The target quantity of codes for the first macro block is as follows:

$$\begin{aligned} TMBa &= Target\text{-}MB \quad (18) \\ &= 732 + [(22.163 - 18)/(24 - 18)] \times (764 - 732) \\ &= 754 \text{ bits.} \end{aligned}$$

The target quantity of codes for the second macro block is as follows:

$$\begin{aligned} TMBa &= Target\text{-}MB \quad (19) \\ &= 720 + [(22.163 - 18)/(24 - 18)] \times (786 - 720) \\ &= 765 \text{ bits.} \end{aligned}$$

(2c) A feedback threshold is a 30-bit fixed value as in first encoding.

(2d) First macro block

The target quantity of codes (the output from the allocating means 24) in units of macro block is Target-MB (=754 bits). As the second adding means 28 is initialized and zero, a feedback value output from the first adding means 26 is also zero. Therefore, the second adding means 28 executes calculation as follows:

$$TMBb = TMBa + FB = 754 + 0 = 754 \text{ bits} \quad (20)$$

and thus they become the target quantity of codes TMBb output in feedback control.

The Q search means 30 acquires a quantized value such that the quantity of generated codes in units of macro block does not exceed 754 bits acquired in the above expression (20). As actually shown in FIG. 17 in which the quantized values and each quantity of generated codes in units of macro block are extracted, the value, "20" is selected as a quantized value which does not exceed 754 bits.

In the back search means 32, the remainder after the quantization of a DCT coefficient in units of macro block at quantized values including the quantized value acquired from the Q search means 30 or a large value is summed and the quantized value in first encoding is acquired based upon relationship between the maximum value and the minimum value of the sum.

When the quantized value is "22", the minimum value of the sum is 4 bits and when the quantized value is "112", the maximum value of the sum is 8167 bits. As the maximum value is equivalent to 204 times of the minimum value, it is judged that the quantized value, "22" is used in first encoding and the quantized value, "22" is output from the back search means 32.

In the quantizing means 34, a DCT coefficient is quantized using the quantized value, "22" output from the back search means 32.

In the variable length coding means 36, a variable length code is generated based upon the quantized DCT coefficient. Also, difference DF between the target quantity of codes TMBb in units of macro block and the quantity of codes actually generated by the variable length coding means 36 is acquired and is fed back to the allocating means 20.

As the quantity of generated codes in units of macro block at the quantized value, "22" is 734 bits as shown in FIG. 20, the differential value DF between the above quantity and the target quantity of codes TMBb (=754 bits) in units of macro block is calculated as follows:

$$DF = 754 - 734 = 20 \text{ bits} \tag{21}$$

and the differential value DF is fed back to the allocating means 20.

(2e) Second macro block

According to the above expression (19), the target quantity of codes TMBb in units of the second macro block is set as follows:

$$TMBb2 = Target - MB = 765 \text{ bits.} \tag{22}$$

The first adding means 26 has 20 bits which are equivalent to a differential value DF in the first macro block between the target quantity of codes TMBb in units of macro block and the quantity of generated codes as clear from the above expression (21). As a feedback threshold is 30 bits as described above, the output from the first adding means 26 is 20 bits. As the first adding means 26 already outputs 20 bits as feedback FB, the above output is zero as a result. The second adding means 28 adds the target quantity of codes TMBb as follows:

$$TMBb = 765 + 20 = 785 \text{ bits} \tag{23}$$

and they are the target quantity of code in feedback control.

The Q search means 30 acquires a quantized value such that the quantity of generated codes in units of macro block does not exceed 786 bits. As actually shown in FIG. 18 in which quantized values and each quantity of generated codes in units of macro block are extracted, the value, "20" is selected as a quantized value which does not exceed 786 bits.

In the back search means 32, the remainder after the quantization of a DCT coefficient in units of macro block at quantized values including the quantized value acquired from the Q search means 30 as described above or a larger value is summed and the quantized value in first encoding is acquired based upon relationship between the maximum value and the minimum value of the sum.

When the quantized value is "20", the minimum value of the sum is 37 bits and when the quantized value is "104", the maximum value of the sum is 851 bits. As the maximum value is equivalent to 23 times of the minimum value, the output, "20" of the quantized value from the Q search means 30 is set as the output from the back search means 32.

In the quantizing means 34, a DCT coefficient is quantized using the quantized value, "20" output from the back search means 32.

In the variable length coding means 36, a variable length code is generated based upon the quantized DCT coefficient. Also, difference DF between the target quantity of codes TMBb in units of macro block and the quantity of codes actually generated by the variable length coding means 36 is calculated and is fed back to the allocating means 20.

As the quantity of generated codes in units of macro block at the quantized value, "20" is 784 bits as shown in FIG. 21, the differential value between the above quantity and the target quantity of codes TMBb (=785 bits) in units of macro block is calculated as follows:

$$DF = 785 - 784 = 1 \text{ bit} \tag{24}$$

and the differential value is output to the allocating means 20. Second encoding is finished by the above processing.

(3) Result in the conventional type method

As the above result, the quantized values are as shown in FIG. 19.

For the first macro block, the quantized values are the same in first encoding and in second encoding. However, for the second macro block, the quantized values in first encoding and in second encoding are different. This means that when encoding/decoding is repeated, the quality of a picture is deteriorated.

FIG. 20 shows the SNR of an input picture in first encoding and the SNR of an input picture in second encoding respectively calculated in units of macro block. FIG. 20 is a computational example of a luminance signal Y.

Next, a case that the target quantity of codes is set controlling the quantity of feedback as in the present invention will be described. A part of description will overlap with the above description.

(4) A method according to the present invention

Next, a method of setting an applicable feedback threshold reflecting the contents of input image data according to the present invention will be described below.

(5) First encoding (5a) Value quantized by a fixed quantizer

When eight fixed quantized values are selected as heretofore as shown in FIG. 13, each quantity of generated codes at each fixed quantizer 14 at that time is as shown in FIG. 14.

(5b) Target quantity of codes and the allocation of the quantity of codes

Suppose that the target quantity of codes in units of GOP is 1520 bits as in the example of the conventional type. Two quantized values, "18" and "24" adjacent to 1520 bits which are the target quantity of codes in units of GOP are acquired based upon each quantity of generated codes in units of GOP from eight (N=8) fixed quantizers 14 as clear from FIG. 14.

A quantized value Q corresponding to 1520 bits which are the target quantity of codes in units of GOP is acquired by linear approximation based upon each quantity of generated codes in units of GOP at the above two quantized values, "18" and "24" as follows:

$$Q=18+[(1520-1352)/(1572-1352)]\times(24-18)=22.582 \tag{25A}$$

Also, the target quantity of codes Target-MB (TMB) in units of macro block is linearly approximated by using the quantized value Q (=22.582) acquired in the above expression (25A), based upon each quantity of generated codes in units of macro block at the two quantized values, "18" and "24" as follows:

$$\begin{aligned}\text{Target}-\text{MB} &= \text{TMBa} \\ &= 676 + [(22.582-18)/(24-18)] \times (786-676) \\ &= 760 \text{ bits.}\end{aligned} \tag{25B}$$

(5c) Calculation of a feedback threshold

A feedback threshold is calculated based upon each quantity of generated codes in units of GOP from eight fixed quantizers 14.

First, the judging means 42 check whether an input picture is encoded/decoded in the past or not. Concretely, the judging means calculates the gradient of each quantity of generated codes in units of GOP, checks whether the gradient is monotonous or not, judges that if the gradient is monotonous, the input picture is not encoded/decoded in the past and judges that if the gradient is not monotonous, the input picture is encoded/decoded in the past.

The computational expression of a gradient GD is as follows:

$$GD = \alpha/\beta \tag{26}$$

$$\begin{aligned}\alpha = &\text{ (quantity of generated codes in units of GOP from} \\ &\text{ "i"th fixed quantizer} - \text{quantity of generated codes} \\ &\text{ in units of GOP from (i + 1)th fixed quantizer);}\end{aligned} \tag{27}$$

$$\beta = ((i+1)\text{th quantizer value} - \text{"i"th quantized value}) \tag{28}$$

where "i" is 1 to 7.

When the gradient GD is actually calculated, it is as shown in FIG. 21 and as the gradient is monotonous, the result of judgment that an input picture is not encoded/decoded in the past is obtained from the judging means 42.

Next, feedback control means 44 calculates a feedback threshold based upon the result of the judgment and each quantity of generated codes in units of GOP from eight fixed quantizers 14.

In the present invention, when it is judged that encoding/decoding is not executed, a feedback threshold at which the variation of quantized values between macro blocks is reduced as much as possible is calculated and conversely, when it is judged that encoding/decoding is executed, a feedback threshold at which the quantized value in first encoding can be found is calculated under back search algorithm by the back search means 32.

A feedback threshold is calculated in the following steps (5d-1) to (5d-4).

Step (5d-1):

First, as shown in FIG. 22, two quantized values adjacent to 1520 bits which are the target quantity of codes in units of GOP are acquired based upon each quantity of generated codes in unit of GOP from eight fixed quantizers 14. As also clear from FIG. 22, the values, "18" and "24" are selected as the two quantized values adjacent to the target quantity of codes.

Step (5d-2):

As the quantized values, "18" and "24" are not the minimum quantized width, the quantity of generated codes in units of GOP at a quantized value which is the minimum quantized width is acquired by linear approximation utilizing each quantity of generated codes in units of GOP at the quantized values, "18" and "24".

Quantized values, "20" and "22" exist between the quantized values, "18" and "24" and the approximate value of the quantity of generated codes in units of GOP at the quantized value, "22" is as follows:

$$1352+[(24-22)/(24-18)]\times(1572-1352)=1425.33 \tag{29}$$

The approximate value of the quantity of generated codes in units of GOP at the quantized value, "20" is as follows:

$$1352+[(24-20)/(24-18)]\times(1572-1352)=1498.67 \tag{30}$$

Step (5d-3):

When two quantized values adjacent to the target quantity of codes in units of GOP, 1520 bits are acquired again based upon each quantity of generated codes in units of GOP at the quantized values, "18" and "24" and each quantity of generated codes in units of GOP acquired in the above approximate expression at the quantized values, "20" and "22", they are "18" and "20" as clear from the above numeric values. When the respective quantities of generated codes in units of GOP at that time are converted to an integer, they are 1572 bits and 1499 bits.

Step (5d-4):

A feedback threshold is calculated based upon the target quantity of codes in units of GOP and two quantities of generated codes in units of GOP adjacent to the above target quantity of codes. First, quantities UNC and LNC will be defined. UNC shows a differential value between the quantity of generated codes, 1572 bits exceeding the target quantity of codes out of two quantities of generated codes in units of GOP acquired in the step (5d-3) and the target quantity of codes in units of GOP, 1520 bits.

As LNC is a differential value between the target quantity of codes in units of GOP, 1520 bits and the quantity of generated codes, 1499 bits not exceeding the target quantity of codes out of two quantities of generated codes in units of GOP acquired in the step (5d-3), UNC and LNC are as follows:

$$UNC=1572-1520=52 \text{ bits; and} \tag{31}$$

$$LNC=1520-1499=21 \text{ bits.} \tag{32}$$

At this time, a feedback threshold FBT can be selected as follows:

$$FBT = \min[UNC \times (3/8), LNC]; \tag{33}$$

as a result;

-continued $$FBT = \min[UNC \times (3/8), LNC] \quad (34)$$
$$= \min[52 \times (3/8), 21]$$
$$= (19.5, 21)$$
$$= 19.5$$
$$= 20 \text{ (counting fractions over } 1/2 \text{ as one}$$
$$\text{and disregarding the rest).}$$

A feedback threshold output from the feedback control means 60 is calculated to 20 bits by the above calculation.

(5e) First macro block

The target quantity of codes (output from the allocating means 24) in units of macro block is Target-MB (=760 bits). As the second adding means 28 is initialized and zero, a feedback value output from the first adding means 26 is also zero. Therefore, the second adding means 28 executes calculation as follows:

$$TMBb = TMBa + FB = 760 + 0 = 760 \text{ bits} \quad (35)$$

and thus they become the target quantity of codes TMBb output in feedback control.

The Q search means 30 acquires a quantized value such that the quantity of generated codes in units of macro block does not exceed 760 bits acquired in the above expression (35). As actually shown in FIG. 15 in which quantized values and the respective quantities of generated codes in units of macro block are extracted, the value, "22" is selected as a quantized value not exceeding 760 bits.

The back search means 32 sums the remainder after the quantization of a DCT coefficient in units of macro block at quantized values including the quantized value acquired from the Q search means 30 or a larger value and acquires a quantized value in first encoding based upon relationship between the maximum value and the minimum value of the sum.

When the quantized value is "22", the minimum value of the sum is 122 bits and when the quantized value is "112", the maximum value of the sum is 917 bits. As the maximum value is equivalent to 7.52 times of the minimum value, the quantized value, "22" in first encoding is output from the back search means 32.

The quantizing means 34 quantizes a DCT coefficient using the quantized value, "22" output from the back search means 32.

The variable length coding means (VLC) 36 generates a variable length code based upon the quantized DCT coefficient. Also, difference DF between the target quantity of codes TMBb in units of macro block and the quantity of codes actually generated by the variable length coding means 36 is calculated and is fed back to the allocating means 20.

As the quantity of generated codes in units of macro block at the quantized value, "22" is 734 bits as shown in FIG. 15, the differential value between the above quantity and the target quantity of codes TMBb (=760 bits) in units of macro block is acquired in the following expression;

$$DF = 760 - 734 = 26 \text{ bits} \quad (36)$$

and the differential value is fed back to the allocating means 20.

(5f) Second macro block

The target quantity of codes TMBb in units of macro block is as follows:

$$TMBb2 = \text{Target-MB} = 760 \text{ bits.} \quad (37)$$

As clear from the above expression (36), the first adding means 26 has twenty six bits which are equivalent to a differential value DF in the first macro block between the target quantity of codes TMBb in units of macro block and the quantity of generated codes. As the calculated feedback threshold is 20 bits as described above, the output from the first adding means 26 is 20 bits. As the first adding means 26 outputs 20 bits as feedback FB, the six bits are left as a result. In the second adding means 28, the target quantity of codes TMBb after feedback control is as follows:

$$TMBb = 760 + 20 = 780 \text{ bits.} \quad (38)$$

The Q search means 30 acquires a quantized value such that the quantity of generated codes in units of macro block does not exceed 760 bits. As actually shown in FIG. 23 in which quantized values and the respective quantities of generated codes in units of macro block are extracted, the value, "20" is selected as a quantized value not exceeding 780 bits.

In the back search means 32, the remainder after the quantization of a DCT coefficient in units of macro block at quantized values including the quantized value acquired from the Q search means 30 as described above or a larger value is summed and a quantized value in first encoding is acquired based upon relationship between the maximum value and the minimum value of the sum.

When the quantized value is "20", the minimum value of the sum is 97 bits and when the quantized value is "112", the maximum value of the sum is 917 bits. As the maximum value is equivalent to 9.45 times of the minimum value, the quantized value, "20" from the Q search means 30 is set as the output from the back search means 32.

In the quantizing means 34, a DCT coefficient is quantized using the quantized value, "20" output from the back search means 32.

In the variable length coding means 36, a variable length code is generated based upon the quantized DCT coefficient. Also, difference DF between the target quantity of codes TMBb in units of macro block and the quantity of codes actually generated by the variable length coding means 36 is acquired and is fed back to the allocating means 20.

As the quantity of generated codes in units of micro block at the quantized value, "20" is 766 bits as shown in FIG. 23, the differential value DF between the above quantity and the target quantity of codes TMBb (=780 bits) in units of macro block is calculated as follows:

$$DF = 780 - 766 = 14 \text{ bits} \quad (39)$$

and the differential value DF is output to the allocating means 20.

First encoding is finished by the above processing. VLC acquired from the variable length coding means 36 is decoded and then, second encoding is executed.

(6) Second encoding (6a) Values quantized by the fixed quantizers 14

As in first encoding, eight fixed quantized values are selected out of 31 quantized values as shown in FIG. 13. These quantized values are the same as in first encoding. The quantity of generated codes at each fixed quantizer 14 at this time is as shown in FIG. 24. As shown in FIG. 24, the reason why a first macro block and a second macro block are different in the quantity of generated codes is that the respective quantized values in first encoding are different because they are "22" and "20".

(6b) Target quantity of codes and the allocation of the quantity of codes

As the target quantity of codes TMB in units of GOP is 1520 bits, two quantized values adjacent to 1520 bits which are the target quantity of codes TMB in units of GOP are acquired based upon each quantity of generated codes in units of GOP from the eight (N=8) fixed quantizers 14 and they are "18" and "24" as shown in FIG. 24.

A quantized value Q corresponding to 1520 bits which are the target quantity of codes in units of GOP is acquired by linear approximation based upon the respective quantities of generated codes in units of GOP at these two quantized values, "18" and "24" as follows:

$$Q = 18 + [(1520-1482)/(1534-1482)] \times (24-18) = 22.385 \quad (40)$$

Also, the target quantity of codes Target-MB (TMB) in units of macro block is linearly approximated by using the quantized value Q (=22.385) acquired in the above expression (40), based upon the respective quantities of generated codes in units of macro block at the two quantized values, "18" and "24".

The target quantity of codes for a first macro block is as follows:

$$TMBa = Target - MB \quad (41)$$
$$= 732 + [(22.385 - 18)/(24 - 18)] \times (764 - 732)$$
$$= 755 \text{ bits.}$$

The target quantity of codes for a second macro block is as follows:

$$TMBa = Target - MB \quad (42)$$
$$= 750 + [(22.385 - 18)/(24 - 18)] \times (770 - 750)$$
$$= 764 \text{ bits.}$$

(6c) Calculation of a feedback threshold

A feedback threshold is calculated based upon the quantity of generated codes in units of GOP.

As in first encoding, first, it is checked by the judging means 42 whether an input picture is encoded/decoded in the past or not. Concretely, the judging means 42 calculates the gradient of each quantity of generated codes in units of GOP, checks whether the gradient is monotonous or not, judges that if the gradient is monotonous, the input picture is not encoded/decoded in the past and judges that if the gradient is not monotonous, the input picture is encoded/decoded in the past.

The computational expression of a gradient GD is as follows:

$$GD = \alpha / \beta \quad (43)$$

$\alpha$ = (quantity of generated codes in units of GOP from "i"th fixed quantizer – quantity of generated codes in units of GOP from (i + 1)th fixed quantizer); (44)

$\beta$ = ((i + 1)th quantizer value – "i"th quantized value); (45)

where "i" is 1 to 7.

When a gradient GD is actually calculated, it is as shown in FIG. 25 and as the gradient is not monotonous, the result of judgment by the judging means 42 that encoding/decoding is executed in the past is acquired.

Next, the feedback control means 44 calculates a feedback threshold based upon the result of the above judgment and each quantity of generated codes in units of GOP from eight fixed quantizers 14. The feedback threshold is acquired in the following steps (6d-1) to (6d-4).

Step (6d-1):

First, as shown in FIG. 26, the minimum quantity of generated codes exceeding 1520 bits which are the target quantity of codes in units of GOP is acquired based upon each quantity of generated codes in units of GOP from eight fixed quantizers 14. The quantity of generated codes when a quantized value is "18", 1534 bits are selected as shown in FIG. 26.

Step (6d-2):

A feedback threshold is calculated based upon the target quantity of codes in units of GOP and the quantity of generated codes in units of GOP exceeding the above target quantity of codes. Therefore, quantity UC will be defined below. The following UC shows a differential value between the quantity of generated codes exceeding the quantity of generated codes in units of GOP acquired in the step (6d-1) and the target quantity of codes in units of GOP. Therefore, the quantity UC is calculated as follows:

$$UC = 1534 - 1520 = 14 \text{ bits.} \quad (46)$$

At this time, a feedback threshold FBT is, for example, selected as follows:

$$FBT = 5 + UC \times (3/4). \quad (47)$$

As a result;

$$FBT = 5 + 14 \times (3/4) \quad (48)$$
$$= 15.5$$
$$= 16 \text{ (counting fractions over } 1/2 \text{ as one and disregarding the rest).}$$

The feedback threshold of 16 bits is acquired by the above calculation.

(6e) First macro block

The target quantity of codes (output from the allocating means 24) in units of macro block is Target-MB (=755 bits). As the second adding means 28 is initialized and zero, a feedback value output from the first adding means 26 is also zero. Therefore, the second adding means 28 executes calculation as follows:

$$TMBb = TMBa + FBT = 755 + 0 = 755 \text{ bits} \quad (49)$$

and thus they become the target quantity of codes TMBb output in feedback control.

The Q search means 30 acquires a quantized value such that the quantity of generated codes in units of macro block does not exceed 755 bits acquired in the above expression (49). As actually shown in FIG. 27 in which quantized values and the respective quantities of generated codes in units of macro block are extracted, the value, "20" is selected as a quantized value not exceeding 755 bits.

The back search means 32 sums the remainder after the quantization of a DCT coefficient in units of macro block at quantized values including the quantized value acquired from the Q search means 30 or a larger value and acquires the quantized value in first encoding based upon relationship between the maximum value and the minimum value of the sum.

When the quantized value is "22", the minimum value of the sum is 4 bits and when the quantized value is "112", the maximum value of the sum is 816 bits. The quantized value 22 at which the maximum value is 204 times of the minimum value is output from the back search means 32.

The quantizing means 34 quantizes a DCT coefficient using the quantized value, "22" output from the back search means 32.

The variable length coding means 36 generates a variable length code based upon the quantized DCT coefficient. Also, difference DF between the target quantity of codes TMBb in units of macro block and the quantity of codes actually generated by the variable length coding means 36 is acquired and is fed back to the allocating means 20.

As the quantity of generated codes in units of macro block at the quantized value, "22" is 734 bits as shown in FIG. 27, the differential value DF between the above quantity and the target quantity of codes TMBb (=755 bits) in units of macro block is acquired in the following expression;

$$DF = 755 - 734 = 21 \ bits \quad (50)$$

and the differential value is fed back to the allocating means 20.

(6f) Second macro block

The target quantity of codes TMBb in units of macro block is as follows:

$$TMBb2 = Target\text{-}MB = 764 \ bits. \quad (51)$$

As clear from the above expression (50), the first adding means 26 has 21 bits which are equivalent to a differential value DF in the first macro block between the target quantity of codes TMBb in units of macro block and the quantity of generated codes. As the calculated feedback threshold is 16 bits as described above, the output from the first adding means 26 is 16 bits. As the first adding means 26 outputs 16 bits as the feedback threshold FBT, the five bits are left as a result. In the second adding means 28, the target quantity of codes TMBb in feedback control is acquired as follows:

$$TMBb = 764 + 16 = 780 \ bits. \quad (52)$$

In the Q search means 30 acquires a quantized value such hat the quantity of generated codes in units of macro block does not exceed 780 bits. As actually shown in FIG. 28 in which quantized values and the respective quantities of generated codes in units of macro block are extracted, the value, "18" is selected as a quantized value not exceeding 780 bits.

In the back search means 32, the remainder after the quantization of a DCT coefficient in units of macro block at quantized values including the quantized value acquired from the Q search means 30 as described above or a larger value is summed and the quantized value in first encoding is acquired based upon relationship between the maximum value and the minimum value of the sum.

When the quantized value is "20", the minimum value of the sum is 4 bits and when the quantized value is "112", the maximum value of the sum is 780 bits. As the maximum value is equivalent to 195 times of the minimum value, the quantized value, "20" from the Q search means 30 is set as the output from the back search means 32.

In the quantizing means 34, a DCT coefficient is quantized using the quantized value, "20" output from the back search means 32.

In the variable length coding means 36, a variable length code is generated based upon the quantized DCT coefficient. Also, difference DF between the target quantity of codes TMBb in units of macro block and the quantity of codes actually generated by the variable length coding means 36 is acquired and is fed back to the allocating means 20.

As the quantity of generated codes in units of macro block at the quantized value, "20" is 766 bits as shown in FIG. 28, the differential value DF between the above quantity and the target quantity of codes TMBb (=780 bits) in units of macro block is calculated as follows:

$$DF = 780 - 766 = 14 \ bits \quad (53)$$

and the differential value DF is output to the allocating means 20. Second encoding is finished by the above processing.

(7) Results according to the present invention

As the above result, the quantized values are as shown in FIG. 29. In first encoding, difference between quantized values for a first macro block and a second macro block is 2 (=22−20) according to the present invention. In the meantime, in a conventional type method shown in FIG. 19, difference is 4 (=22−18). Therefore, quantized values can be more stabilized according to the present invention.

Also, according to the present invention, quantized values in first encoding and in second encoding for the first macro block are the same and quantized values in first encoding and in second encoding for the second macro block are the same. Hereby, as a quantized value is repeatable even if encoding and decoding are repeated, the quality of a picture is hardly deteriorated, compared with the conventional type method.

When each of the SNRs in the first encoding and in the second encoding of an input picture is calculated in units of macro bock, the result shown in FIG. 30 of a luminance signal Y is acquired. As clear in comparison with FIG. 20 showing an example of the conventional type, according to the present invention, the SNR is improved in second encoding.

The reason why there is difference in effect is that heretofore, a fixed value (for example, 30) is used for a feedback threshold as described above. In other words, as the character of an input picture is not considered in the example of the conventional type, the result of addition in units of GOP based upon difference between the target quantity of codes in units of macro block and the quantity of codes actually generated may be a feedback threshold or less. Therefore, the quantity of feedback greatly varies in units of macro block. As the great variation of the quantity of feedback reflects on the target quantity of codes FBT in units of macro block added by the second adding means 28, a quantized value greatly varies as a result.

In second encoding, as a quantized value greatly varies in first encoding, the target quantity of codes in units of macro block is smaller than the quantity of generated codes in first encoding, the first quantized value cannot be searched in the back search means 32 and thus the quantized value cannot be repeated. Hereby, the quality of a picture is deteriorated.

In the case of the present invention, a feedback threshold is calculated based upon each quantity of generated codes in units of GOP from eight fixed quantizers. Hereby, the result of addition in units of GOP based upon the difference between the target quantity of codes in units of macro block and the quantity of codes actually generated is larger than the feedback threshold. Hereby, the quantity of feedback does not vary in units of macro block and the feedback threshold is approximately fixed. As the quantity of feedback hardly varies as described above, the variation of a quantized value can be avoided.

In second encoding, as a quantized value hardly varies in first encoding, the target quantity of codes in units of macro block is more than the quantity of generated codes in first encoding. Therefore, the first quantized value can be searched in the back search means 32 and the quantized value is repeatable. The quality of a picture can be prevented from being deteriorated by the above processing.

It is described above that whether input image data are already encoded/decoded or not can be judged based upon the gradient of the quantity of generated codes in the above quantization. The reason therefor will be described below. To simplify the description, not the quantity of generated codes but the value of a quantized DCT coefficient will be described.

Suppose that a DCT coefficient such as (2, 5, 8, 10, 14, 21) is obtained. Quantization in first encoding shall be executed at 10. After quantization, the DCT coefficient is (0.2, 0.5, 0.8, 1.0, 1.4, 2.1), counting fractions over ½ as one and disregarding the rest is executed so that (0, 1, 1, 1, 1, 2) is acquired as a value after quantization. If this is inversely quantized at the same value 10 as quantization, it is (0, 10, 10, 10, 10, 20).

Next, quantization in second encoding for (0, 10, 10, 10, 10, 20) will be described. First, when quantization is executed using the same quantized value 10 as in first encoding, (0.0, 1.0, 1.0, 1.0, 1.0, 2.0) is acquired and (0, 1, 1, 1, 1, 2) is acquired after counting fractions over ½ as one and disregarding the rest. If inverse quantization is executed at 10, (0, 10, 10, 10, 10, 20) is acquired. A case that in second encoding, quantization is executed at 12, not the same quantized value, 10 as in first encoding, will be described. At this time, (0.0, 5/6, 5/6, 5/6, 5/6 5/3) is acquired and (0, 1, 1, 1, 1, 2) is acquired after counting fractions over ½ as one and disregarding the rest. If inverse quantization is executed, (0, 12, 12, 12, 12, 24) is acquired.

The value (0, 10, 10, 10, 10, 20) after inverse quantization in case quantization is executed at 10 in second encoding is clearly different from the value (0, 12, 12, 12, 12, 24) in case quantization is executed at 12, however, if viewed from the viewpoint of the quantity of generated codes, there is no difference between quantization at 10 and 12 and (0, 1, 1, 1, 1, 2) is both acquired. A fact that values after quantization are the same means that the quantities of generated codes are the same. That is, even if 10 are used or 12 are used in second encoding, the same quantities of generated codes are acquired.

In quantization in first encoding, the above does not hold true. Actually, if quantization is executed at 12 in first encoding, (1/6, 5/12, 2/3, 5/6, 7/6, 7/4) is acquired. (0, 0, 1, 1, 1, 2) is acquired after fractions over ½ is counted as one and the rest is disregarded and this is different from (0, 1, 1, 1, 1, 2) acquired if quantization is executed at 10 and thus the quantity of generated codes also varies.

As described above, there is great difference between the quantity of generated codes in first encoding and the quantity of generated codes in second encoding in which quantization is once executed. Next, it will be described under what condition the quantity of generated codes after second encoding is the same.

Suppose that a value after quantization is 1. In other words, it is a case that 1 is acquired when quantization is executed at a quantized value Q. To acquire 1, a value of 0.5 or more and smaller than 1.5 is required in consideration of counting fractions over ½ as one and disregarding the rest after quantization. That is, the range of quantized values P at which a result at a quantized value P is 0.5 or more and smaller than 1.5 is equal to the range of quantization in which the quantity of generated codes is the same after second encoding.

The quantity of generated codes at the quantized value P is the same as that at a quantized value Q, by using a quantized value P in the following range:

$$½ <= (Q/P) < 3/2 \tag{54}$$

$$2Q/3 < P <= 2Q \tag{55}$$

Suppose that a value after quantization is 2. In other words, it is a case that 2 are acquired when quantization is executed at a quantized value Q. To acquire 2, a value of 1.5 or more and smaller than 2.5 is required in consideration of counting fractions over ½ as one and disregarding the rest after quantization. That is, the range of quantized values P in which a result at a quantized value P is 1.5 or more and smaller than 2.5 is equal to the range of quantization in which the quantity of generated codes is the same after second encoding.

The quantity of generated codes at the quantized value P is the same as that at a quantized value Q, by using a quantized value P in the following range:

$$3/2 <= (2Q/P) < 5/2 \tag{56}$$

$$4Q/5 < P <= 4Q/3 \tag{57}$$

Similarly, the range of quantization in which the quantities of generated codes are the same in case a value after quantization is 3, 4, ... can be calculated. It means a flat part exists if a graph with quantized values on the x-axis and the quantity of generated codes on the y-axis is formed that the quantities of generated codes are the same. Therefore, it can be judged whether a picture is first encoded or is second encoded by judging whether the above flat part exists or not, that is, whether a gradient monotonously varies or not.

An actual natural picture includes coefficients more complicatedly and hardly includes the above completely flat part. However, as a part in which a gradient is not continuous (monotonous) exists when the gradient between quantized values is calculated, it can be judged based upon the gradient whether first encoding or second encoding is executed.

Embodiments other than the above embodiment of the present invention will be described below.

1. Although GOP is used for a determined unit of the target quantity of codes, the present invention is not limited to GOP. Even if N times (N>1) of a macro block unit which is the minimum processing unit is equivalent to a unit of the target quantity of code, the present invention is effective. However, in this case, a computational unit of a feedback threshold cannot exceed a unit of the target quantity of codes.

2. GOP is used for a computational unit of a feedback threshold. However, if GOP is used, a quantized value is not necessarily stable in the case of encoding/decoding when strictly viewed in units of macro block.

Figure 9:
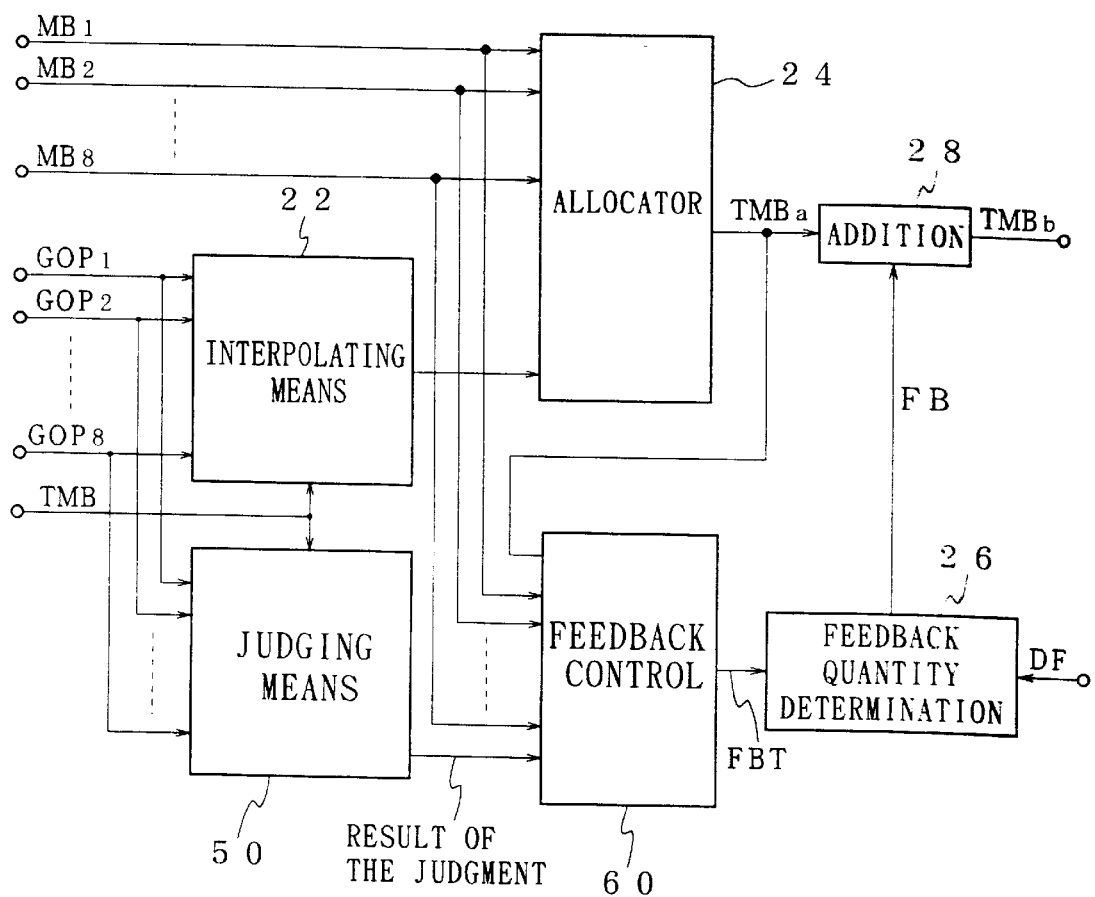
FIG. 9 is a system diagram of the main part showing another example of target code quantity allocating means.

To stabilize a quantized value, it is desirable that a feedback threshold in units of GOP is equivalent to N times (N>=1) of a unit of macro block. For example, it is desirable that if N=1, the quantity of generated codes in a macro block is utilized for the feedback control means 60 as shown in FIG. 9.

Hereby, the target quantity of codes in units of GOP described in the concrete example is equal to the target quantity of codes in units of macro block and thus each quantity of generated codes in units of GOP from two fixed quantizers adjacent to the target quantity of codes in units of GOP has only to be replaced with each quantity of generated codes in units of macro block from two fixed quantizers adjacent to the target quantity of codes in units of macro block.

3. For one of method of enhancing the quality of a picture, there is activity control. In the activity control, to prevent block noise in a flat part such as the sky on the screen, a quantized value is reduced for such a macro block and a quantized value is made larger for a complicated part, for example, a macro block in which it is difficult to find deterioration such as random noise. Hereby, the quality of a picture can be improved.

If such activity control is executed, N pieces of fixed quantizers do not use respective fixed quantized values (FixQ (i), i=1, . . . , N) in units of macro block and quantized values to which variation by applying the activity control to the respective fixed quantized values is added are used.

According to the present invention, even if such activity control is executed, the variation of a quantized value in units of macro block can be controlled by applying computational algorithm assuming that activity control is not executed so that the above variation does not exceed variation by activity control.

The variation of a quantized value by activity control in consideration of the enhancement of the quality of a picture is kept as it is and a quantized value in a part to which activity control is not applied can be stabilized. Also, the repeatability of a quantized value in encoding/decoding can be realized.

In the encoding method according to the present invention and the encoder using it, it is automatically judged based upon each quantity of generated codes from the plural fixed quantizers for estimating the quantity of codes whether input data are encoded/decoded in the past or not; if it is judged that the input data are not encoded/decoded, feedback control depending upon the character of the input data are executed; if the input data are encoded/decoded, feedback control in which repeatability is regarded as important is executed.

Hereby, the above encoding method and the above encoder are provided with characteristics such that the quantity of generated codes can be brought closer to the target quantity of codes, hereby, a quantized value is stabilized and even if encoding/decoding is repeated, the quality of a picture can be prevented from being deteriorated and further, the quality of a picture can be stabilized.

Therefore, the present invention can be extremely suitably applied to an image data compressing and encoding device according to MPEG2 and others.

Industrial Availability

The present invention is applied to an image processor for converting image data and others to a variable length code, transmitting and recording the image data and others.

What is claimed is:

1. An encoding method in which the quantity of generated codes when encoding a predetermined quantity of data is controlled so that predetermined encoding processing generates codes within a predetermined target quantity of codes, comprising the steps of:

feeding a differential value between the quantity of generated codes and the predetermined target quantity of codes back to a target code quantity allocating means;

automatically judging whether input data has been previously encoded/decoded or not; and determining a feedback threshold to be added to said predetermined target quantity of codes based upon the result of the judgment, thus bringing the quantity of generated codes close to the predetermined target quantity of codes.

2. The encoding method according to claim 1, further comprising the steps of:

executing feedback control depending upon the character of the input data when encoding/decoding has not been previously executed; and executing feedback control recognizing repeatability of reproduction of the input data as a primary goal when encoding/decoding has been previously executed.

3. The encoding method according to claim 1, wherein:

said encoding is compatible with MPEG2; and said predetermined quantity of data is a group of video pictures.

4. An encoder provided with target code quantity allocating means for bringing the quantity of codes actually generated close to the target quantity of codes when input data admitting of an estimable character are compressed and encoded, said encoder comprising:

judging means for automatically judging whether input data have previously been encoded/decoded or not based upon a quantity of generated codes generated for each unit of a group of video pictures (GOP) from N (N is an integer) fixed quantizers; and feedback control means for estimating the character of said input data using each quantity of generated codes in units of GOP from said N fixed quantizers and the result of said judging, and for calculating a feedback threshold to be added to said target quantity of codes based upon the estimate.

5. The encoder according to claim 4, including DCT means for transforming said input data to a DCT coefficient, and means supplied with DCT coefficients for calculating the quantity of generated codes in units of GOP and the target quantity of codes in units of macro block.

6. The encoder according to claim 4, wherein:

when said judging means judges that encoding/decoding has not been previously executed, said feedback control means sets a feedback threshold so that a variation of quantized values between macro blocks is reduced using each quantity of generated codes in units of GOP from said N fixed quantizers; and when said judging means judges that encoding/decoding has been previously executed, said feedback control means sets a feedback threshold recognizing repeatability of reproduction of the input data, as a primary goal.

* * * * *